US010644842B2

(12) United States Patent
Bhattad et al.

(10) Patent No.: US 10,644,842 B2
(45) Date of Patent: May 5, 2020

(54) MULTIPLEXING CODE BLOCK GROUP LEVEL AND TRANSPORT BLOCK LEVEL TRANSMISSION AND NEW DATA INDICATIONS

(71) Applicant: QUALCOMM Incorporated, San Diego, CA (US)

(72) Inventors: Kapil Bhattad, Bangalore (IN); Xiaoxia Zhang, San Diego, CA (US); Jing Sun, San Diego, CA (US); Ananta Narayanan Thyagarajan, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/103,641

(22) Filed: Aug. 14, 2018

(65) Prior Publication Data
US 2019/0074937 A1    Mar. 7, 2019

Related U.S. Application Data

(60) Provisional application No. 62/554,721, filed on Sep. 6, 2017.

(51) Int. Cl.
*H04L 1/18* (2006.01)
*H04L 5/00* (2006.01)
(Continued)

(52) U.S. Cl.
CPC .......... *H04L 1/1819* (2013.01); *H04L 1/1887* (2013.01); *H04L 1/1896* (2013.01);
(Continued)

(58) Field of Classification Search
CPC ... H04L 1/1819; H04L 1/1887; H04L 1/1896; H04L 5/0055
See application file for complete search history.

(56) References Cited

U.S. PATENT DOCUMENTS

2013/0301401 A1* 11/2013 Wang .............. H04L 5/001
370/209
2016/0278050 A1* 9/2016 Nory .............. H04W 16/14
(Continued)

FOREIGN PATENT DOCUMENTS

WO  WO2018071104 A1  4/2018
WO  WO2018085045 A1  5/2018
(Continued)

OTHER PUBLICATIONS

Huawei, et al., "Scheduling Mechanisms for CBG-based Retransmission," 3GPP DRAFT; R1-1712200, 3rd Generation Partnership Project (3GPP), Mobile Competence Centre; 650, Route Des Lucioles; F-06921 Sophia-Antipolis Cedex; France, vol. RAN WG1, no. Prague, Czech Republic; Aug. 21, 2017-Aug. 25, 2017, Aug. 20, 2017, XP051315017, 4 pages, Retrieved from the Internet: URL: http://www.3gpp.org/ftp/Meetings_3GPP_SYNC/RAN1/Docs/ [retrieved on Aug. 20, 2017].
(Continued)

*Primary Examiner* — Duc C Ho
(74) *Attorney, Agent, or Firm* — Linda G. Gunderson; Holland & Hart LLP

(57) ABSTRACT

Methods, systems, and devices for multiplexing code block group (CBG) level and transport block (TB) level transmission and new data indications (NDIs) are described. An example method includes generating, for a transmission associated with a set of TBs, a bit sequence including TB-level indication of whether each TB in a first subset of TBs includes a retransmission, and CBG-level indication of whether a second subset of TBs includes a CBG-level retransmission, transmitting at least one grant comprising the bit sequence, and transmitting the transmission in accordance with the bit sequence. Another example method includes receiving a grant comprising a bit sequence including a TB-level indication of whether each TB in a first subset
(Continued)

of TBs includes a retransmission, and CBG-level indication of whether a second subset of TBs includes a CBG-level retransmission, and monitoring for the set of TBs based at least in part on the bit sequence.

30 Claims, 22 Drawing Sheets

(51) Int. Cl.
    *H04L 27/00*     (2006.01)
    *H04L 1/16*     (2006.01)

(52) U.S. Cl.
    CPC .......... *H04L 5/0055* (2013.01); *H04L 5/0091* (2013.01); *H04L 1/1614* (2013.01); *H04L 5/001* (2013.01); *H04L 27/0006* (2013.01)

(56) References Cited

U.S. PATENT DOCUMENTS

| | | | |
|---|---|---|---|
| 2016/0285589 A1 | 9/2016 | Mukkavilli et al. | |
| 2017/0026297 A1 | 1/2017 | Sun et al. | |
| 2018/0132248 A1* | 5/2018 | Yang ..................... | H04L 1/1812 |
| 2018/0145703 A1 | 5/2018 | Li et al. | |
| 2018/0278368 A1* | 9/2018 | Kim ....................... | H04L 1/1829 |
| 2018/0367253 A1* | 12/2018 | Nammi ................... | H04L 1/08 |
| 2019/0207734 A1* | 7/2019 | Yang ....................... | H04L 5/001 |

FOREIGN PATENT DOCUMENTS

| | | |
|---|---|---|
| WO | WO-2018128369 A1 | 7/2018 |
| WO | WO-2018183644 A1 | 10/2018 |

OTHER PUBLICATIONS

International Search Report and Written Opinion—PCT/US2018/046820—ISA/EPO—dated Nov. 29, 2018.

* cited by examiner

TB-level Indication of New Data
(e.g., TB-level NDI field toggled = True)

TB-level Indication of Retransmission
(e.g., TB-level NDI field toggled = False)

CBG-level Indication of No Retransmission
(without associated retransmission grant)

CBG-level Indication of Retransmission
(with associated retransmission grant)

US 10,644,842 B2

MULTIPLEXING CODE BLOCK GROUP LEVEL AND TRANSPORT BLOCK LEVEL TRANSMISSION AND NEW DATA INDICATIONS

CROSS REFERENCES

The present Application for Patent claims the benefit of U.S. Provisional Patent Application No. 62/554,721 by BHATTAD et al., entitled "MULTIPLEXING CODE BLOCK GROUP LEVEL AND TRANSPORT BLOCK LEVEL TRANSMISSION AND NEW DATA INDICATIONS," filed Sep. 6, 2017, assigned to the assignee hereof, and incorporated by reference herein.

BACKGROUND

The following relates generally to wireless communication, and more specifically to multiplexing code block group level and transport block level transmission and new data indications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, data may be transmitted to a target device according to a transport block (TB) arrangement, where a TB may include a plurality of code blocks (CBs). The target device for the data transmission may transmit acknowledgment (ACK) feedback for each TB that is successfully received, and negative-acknowledgment (NACK) feedback for each TB that is not successfully received. For those TBs associated with a transmitted NACK, the data associated with the TB may be retransmitted to the target device. However, retransmitting the entire TB may waste transmission resources when some of the CBs of a particular TB were received successfully and some of the CBs of the particular TB were not received successfully, and the entire TB is retransmitted to the target device.

SUMMARY

The described techniques relate to improved methods, systems, devices, and apparatuses that support multiplexing code block group (CBG) level and TB-level transmission and new data indicators (NDIs) (e.g., indications of whether a TB or CBG includes a retransmission or new data). For example, a first device may transmit a first data transmission to a second device according to a TB arrangement (e.g., a set of TBs), where each TB may be associated with a unique hybrid automatic repeat request (HARQ) identifier (ID) for coordinating transmission and retransmission operations. Each transmitted TB may include one or more CBGs, and each CBG may include at least one CB. The second device may receive all of the first data transmission, none of the first data transmission, or some portion of the first transmission, and in response the second device may provide feedback to the first device that includes CBG-level feedback (e.g., CBG-level ACK/NACK) for at least a portion of the transmitted data. Accordingly, in response to the feedback, the first device may transmit a second data transmission, which may include new data, retransmitted data, or a combination thereof, where retransmitted data may be transmitted at a TB-level or a CB-level. In accordance with one or more aspects of the present disclosure, the second data transmission may be accompanied by control signaling (e.g., a grant or other physical control channel indicator) including multiplexed CBG-level and TB-level NDIs, indicating whether the second data transmission includes CBG-level and/or TB-level retransmissions.

By multiplexing CBG-level and TB-level transmissions and NDIs in accordance with aspects of the present disclosure, a wireless communications system can support more efficient retransmission communication by reducing redundant retransmissions of CBG-level data (e.g., a redundant retransmission of a CBG that was received successfully, but accompanied a CBG of the same TB that was not received successfully), while also utilizing fewer communications resources than CBG-level NDIs alone. In some examples, an NDI signaling arrangement may selected in order to balance the utilization of TB-level NDIs and CBG-level NDIs, and the signaling required for the particular NDI signaling arrangement, in the context of available communications resources and various network conditions.

A method of wireless communication is described. The method may include generating, for a transmission associated with a set of TBs, a bit sequence including TB-level indication (e.g., a TB-level NDI) of whether each TB in a first subset of TBs in the set of TBs includes a retransmission, and CBG-level indication (e.g., a CBG-level NDI) of whether a second subset of TBs in the set of TBs includes a CBG-level retransmission, transmitting at least one grant comprising the bit sequence, and transmitting the transmission associated with the set of TBs in accordance with the bit sequence.

An apparatus for wireless communication is described. The apparatus may include means for generating, for a transmission associated with a set of TBs, a bit sequence including TB-level indication (e.g., a TB-level NDI) of whether each TB in a first subset of TBs in the set of TBs includes a retransmission, and CBG-level indication (e.g., a CBG-level NDI) of whether a second subset of TBs in the set of TBs includes a CBG-level retransmission, means for transmitting at least one grant comprising the bit sequence, and means for transmitting the transmission associated with the set of TBs in accordance with the bit sequence.

Another apparatus for wireless communication is described. The apparatus may include a processor, memory in electronic communication with the processor, and instructions stored in the memory. The instructions may be executable by the processor to generate, for a transmission associated with a set of TBs, a bit sequence including TB-level indication (e.g., a TB-level NDI) of whether each TB in a first subset of TBs in the set of TBs includes a retransmission, and CBG-level indication (e.g., a CBG-level NDI) of whether a second subset of TBs in the set of TBs includes a CBG-level retransmission, transmit at least one grant comprising the bit sequence, and transmit the transmission associated with the set of TBs in accordance with the bit sequence.

A non-transitory computer readable medium for wireless communication is described. The non-transitory computer-readable medium may include instructions operable to cause a processor to generate, for a transmission associated with a set of TBs, a bit sequence including TB-level indication (e.g., a TB-level NDI) of whether each TB in a first subset of TBs in the set of TBs includes a retransmission, and CBG-level indication (e.g., a CBG-level NDI) of whether a second subset of TBs in the set of TBs includes a CBG-level retransmission, transmit at least one grant comprising the bit sequence, and transmit the transmission associated with the set of TBs in accordance with the bit sequence.

In some examples of the method, apparatus, and non-transitory computer-readable medium described above, generating the bit sequence may include operations, features, means, or instructions for generating a first subsequence of the bit sequence indicating whether each TB in the set of TBs includes a retransmission (e.g., a first subsequence including TB-level NDIs for each TB in the set of TBs), and a second subsequence indicating, for a respective TB that may be indicated by the first subsequence to include a retransmission, whether a respective CBG in a set of CBGs for the respective TB includes a CBG-level retransmission (e.g., a second subsequence including CBG-level NDIs for a respective TB indicated by the first subsequence to include a retransmission). In some examples, the set of TBs may be in an order, and the second subsequence identifies: a defined number of TBs in the set of TBs at a beginning of the order as including a CBG-level retransmission, or a defined number of TBs in the set of TBs at an ending of the order as including a CBG-level retransmission, or a defined number of TBs in the set of TBs, after skipping a second defined number of TBs in the order that were not successfully received, as including a CBG-level retransmission.

In some examples, generating the bit sequence may include operations, features, means, or instructions for generating a third subsequence of one or more bits in the bit sequence indicating an order of the one or more TBs in the set of TBs that include a CBG-level retransmission from among the TBs indicated by the first subsequence as including a retransmission. In some examples, generating the bit sequence may include operations, features, means, or instructions for generating a third subsequence of one or more bits in the bit sequence indicating that a defined number of TBs in the set of TBs do not include a CBG-level retransmission. In some examples, transmitting at least one grant comprising the bit sequence includes transmitting the first subsequence in a first grant, and transmitting the second subsequence, or at least a portion thereof, in the first grant or in a second grant (e.g., different from the first grant).

In some examples of the method, apparatus, and non-transitory computer-readable medium described above, generating the bit sequence may include operations, features, means, or instructions for generating a bitmap in the bit sequence having a length corresponding to a number of TBs in the set of TBs that may be a TB-level retransmission generated based at least in part on receiving CBG-level feedback. In some examples, generating the bit sequence may include operations, features, means, or instructions for generating a first subsequence of the bit sequence indicating whether a respective TB in the set of TBs includes a retransmission, wherein the bitmap indicates which of the respective TBs in the set of TBs may be a TB-level retransmission that includes a CBG-level retransmission (e.g., associated with a CBG HARQ retransmission grant). In some examples, the bit map indicates a defined amount of resources for the CBG HARQ retransmission grant. In some examples, the defined amount of resources may be based at least in part on a number of retransmissions in the set of TBs.

In some examples of the method, apparatus, and non-transitory computer-readable medium described above, generating the bit sequence may include operations, features, means, or instructions for generating a first bit map in the bit sequence to indicate the first and second subsets of TBs. In some examples, generating the bit sequence may include operations, features, means, or instructions for generating a set of bitmaps in the bit sequence to indicate TB-level NDIs or TB-level grants for the first subset of TBs and CBG-level NDIs or CBG-level HARQ retransmission grants for the second subset of TBs. In some examples, the TB-level grants indicate whether a respective TB in the first subset of TBs includes a TB-level retransmission.

In some examples of the method, apparatus, and non-transitory computer-readable medium described above, generating the bit sequence may include operations, features, means, or instructions for generating a bitmap to indicate that each TB in the second subset of TBs may be associated with a CBG-level NDI or CBG-level retransmission grant and that each TB in a subset of the first subset of TBs may be associated with a TB-level NDI or a TB-level grant for a new TB transmission.

Some examples of the method, apparatus, and non-transitory computer-readable medium described above may further include operations, features, means, or instructions for receiving an acknowledgement message associated with a set of feedback identifiers, and the grant corresponds to a subset of the feedback identifiers.

Some examples of the method, apparatus, and non-transitory computer-readable medium described above may further include operations, features, means, or instructions for determining a sum of CBGs to be retransmitted for each TB in a set of TBs that includes a retransmission, and identifying the second subset of TBs based at least in part on the sums.

Some examples of the method, apparatus, and non-transitory computer-readable medium described above may further include operations, features, means, or instructions for allocating fixed resources to each TB of the set of TBs.

Some examples of the method, apparatus, and non-transitory computer-readable medium described above may further include operations, features, means, or instructions for allocating resources to each TB of the set of TBs based at least in part on a ratio of a number of CBGs to be transmitted to a total number of CBGs in a respective TB in the set of TBs.

A method of wireless communication is described. The method may include receiving a grant comprising a bit sequence including a TB-level indication (e.g., a TB-level NDI) of whether each TB in a first subset of TBs in the set of TBs includes a retransmission, and CBG-level indication (e.g., a CBG-level NDI) of whether a second subset of TBs in the set of TBs includes a CBG-level retransmission and monitoring for the set of TBs based at least in part on the bit sequence.

An apparatus for wireless communication is described. The apparatus may include means for receiving a grant comprising a bit sequence including a TB-level indication (e.g., a TB-level NDI) of whether each TB in a first subset of TBs in the set of TBs includes a retransmission, and CBG-level indication (e.g., a CBG-level NDI) of whether a second subset of TBs in the set of TBs includes a CBG-level retransmission and means for monitoring for the set of TBs based at least in part on the bit sequence.

Another apparatus for wireless communication is described. The apparatus may include a processor, memory in electronic communication with the processor, and instructions stored in the memory. The instructions may be executable by the processor to receive a grant comprising a bit sequence including a TB-level indication (e.g., a TB-level NDI) of whether each TB in a first subset of TBs in the set of TBs includes a retransmission, and CBG-level indication (e.g., a CBG-level NDI) of whether a second subset of TBs in the set of TBs includes a CBG-level retransmission and monitor for the set of TBs based at least in part on the bit sequence.

A non-transitory computer readable medium for wireless communication is described. The non-transitory computer-readable medium may include instructions operable to cause a processor to receive a grant comprising a bit sequence including a TB-level indication (e.g., a TB-level NDI) of whether each TB in a first subset of TBs in the set of TBs includes a retransmission, and CBG-level indication (e.g., a CBG-level NDI) of whether a second subset of TBs in the set of TBs includes a CBG-level retransmission and monitor for the set of TBs based at least in part on the bit sequence.

Some examples of the method, apparatus, and non-transitory computer-readable medium described above may further include operations, features, means, or instructions for processing a first subsequence of the bit sequence for determining whether each TB in the set of TBs includes a retransmission, and a second subsequence indicating, for a respective TB that may be indicated by the first subsequence to include a retransmission, whether a respective CBG in a set of CBGs for the respective TB includes a CBG-level retransmission. In some examples, the set of TBs may be in an order, and the second subsequence may identify a defined number of TBs in the set of TBs at a beginning of the order as including a CBG-level retransmission, or a defined number of TBs in the set of TBs at an ending of the order as including a CBG-level retransmission, or a defined number of TBs in the set of TBs, after skipping a second defined number of TBs in the order that were not successfully received, as including a CBG-level retransmission.

Some examples of the method, apparatus, and non-transitory computer-readable medium described above may further include operations, features, means, or instructions for processing a third subsequence of one or more bits in the bit sequence indicating an order of the one or more TBs in the set of TBs that include a CBG-level retransmission from among the TBs indicated by the first subsequence as including a retransmission. Some examples of the method, apparatus, and non-transitory computer-readable medium described above may further include operations, features, means, or instructions for processing a third subsequence of one or more bits in the bit sequence for determining that a defined number of TBs in the set of TBs do not include a CBG-level retransmission. In some examples, the first subsequence and the second subsequence may be received in a first grant. Some examples may include receiving a second grant (e.g., different from the first grant), and at least a portion of the second subsequence may be included in or received in the second grant.

Some examples of the method, apparatus, and non-transitory computer-readable medium described above may further include operations, features, means, or instructions for processing a bit map in the bit sequence having a length corresponding to a number of TBs in the set of TBs that may be a TB-level retransmission generated based at least in part on receiving CBG-level feedback. Some examples may further include operations, features, means, or instructions for processing a first subsequence of the bit sequence indicating whether a respective TB in the set of TBs includes a retransmission, and the bitmap may indicate which of the respective TBs in the set of TBs may be a TB-level retransmission that includes a CBG HARQ retransmission grant. In some examples, the bit map indicates a defined amount of resources for the CBG-level retransmission grant. In some examples, the defined amount of resources may be based at least in part on a number of retransmissions in the set of TBs.

Some examples of the method, apparatus, and non-transitory computer-readable medium described above may further include operations, features, means, or instructions for processing a first bit map in the bit sequence for identifying the first and second subsets of TBs. Some examples of the method, apparatus, and non-transitory computer-readable medium described above may further include operations, features, means, or instructions for processing a set of bit maps in the bit sequence for identifying TB-level NDIs or TB-level grants for the first subset of TBs and CBG-level NDIs or CBG-level HARQ retransmission grants for the second subset of TBs. In some examples of the method, apparatus, and non-transitory computer-readable medium described above, the TB-level grants indicate whether a respective TB in the first subset of TBs includes a TB-level retransmission.

Some examples of the method, apparatus, and non-transitory computer-readable medium described above may further include operations, features, means, or instructions for processing a bitmap of the bit sequence to identify that each TB in the second subset of TBs may have a CBG-level retransmission grant and that each TB in a subset of the first subset of TBs may have a TB-level grant for a new TB transmission.

Some examples of the method, apparatus, and non-transitory computer-readable medium described above may further include operations, features, means, or instructions for transmitting an acknowledgement message associated with a set of feedback identifiers, and the grant may correspond to a subset of the feedback identifiers.

Some examples of the method, apparatus, and non-transitory computer-readable medium described above may further include operations, features, means, or instructions for determining a sum of CBGs to be retransmitted for each TB in a set of TBs that includes a retransmission, and identifying the second subset of TBs based at least in part on the sums.

Some examples of the method, apparatus, and non-transitory computer-readable medium described above may further include operations, features, means, or instructions for determining that the grant allocates fixed resources to each TB of the set of TBs.

Some examples of the method, apparatus, and non-transitory computer-readable medium described above may further include operations, features, means, or instructions for determining that the grant allocates resources to each TB of the set of TBs based at least in part on a ratio of a number of CBGs to be transmitted to a total number of CBGs in a respective TB of the set of TBs.

DETAILED DESCRIPTION

Figure 1:
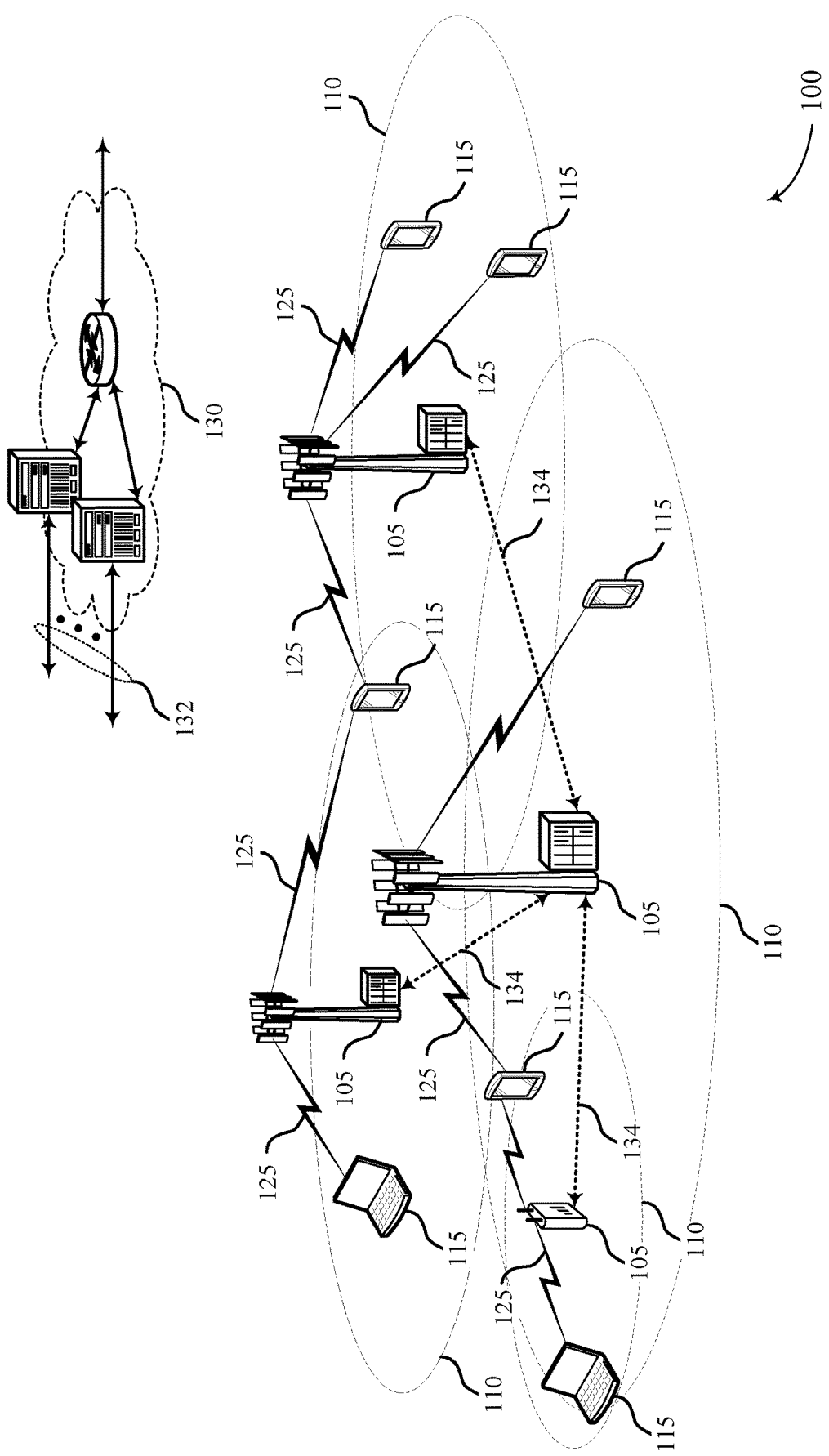
FIG. 1 illustrates an example of a wireless communications system that supports multiplexing CBG-level and TB-level transmission and NDIs in accordance with aspects of the present disclosure.

The described techniques relate to improved methods, systems, devices, and apparatuses that support multiplexing CBG-level and TB-level transmission and NDIs. For example, a first device may transmit a first data transmission to a second device according to a TB arrangement (e.g., a set of TBs), where each TB may be associated with a unique HARQ identifier (ID) for coordinating transmission and retransmission operations. Each transmitted TB may include one or more CBGs, and each CBG may include at least one CB. The second device may receive all of the first data transmission, none of the first data transmission, or some portion of the first transmission, and in response the second device may provide feedback to the first device that includes CBG-level feedback (e.g., CBG-level ACK/NACK) for at least a portion of the transmitted data. Accordingly, in response to the feedback, the first device may transmit a second data transmission, which may include new data, retransmitted data, or a combination thereof, where retransmitted data may be transmitted at a TB-level or a CB-level. In accordance with one or more aspects of the present disclosure, the second data transmission may be accompanied by control signaling (e.g., a grant or other physical control channel indicator) including multiplexed CBG-level and TB-level NDIs, indicating whether the second data transmission includes CBG-level or TB-level retransmissions.

The multiplexed CBG-level and TB-level NDIs may be in the form of a bit sequence, and may include various NDI signaling arrangements including those described herein. For example, as indicated by a particular NDI signaling arrangement, a value of "1" in a portion of the bit sequence (e.g., a subsequence) may indicate new data for a particular TB or CBG, and a value of "0" in the portion of the bit sequence may indicate a retransmission for a particular TB or CBG. In some examples of CBG-level NDIs, a value of "0" may indicate a retransmission (e.g., in response to an indication that the CBG had not been successfully received) and may be associated with a resource grant for the respective CBG, and a value of "1" may indicate no retransmission for the respective CBG (e.g., in response to an indication that the CBG had been successfully received), and may not be associated resource grant for the respective CBG.

In another example, an indication of new data or retransmission may be inferred from a toggling behavior of an NDI field of a bit sequence, where a change in value of an NDI field may provide an indication of new data or retransmission. For example, a bit of a TB-level NDI field for a HARQ ID changing from a "0" to a "1" or from a "1" to a "0" may indicate data of a new TB for the HARQ ID. A bit of a TB-level NDI field for a HARQ ID maintaining a value of a "0" or maintaining a value of a "1" may indicate a retransmission of data of a TB for the HARQ-ID, which may include a TB-level retransmission or a CBG-level retransmission, and may be accompanied by a TB-level grant or a CBG-level grant. Likewise, a bit of a CBG-level NDI field for a HARQ ID changing from a "0" to a "1" or from a "1" to a "0" may indicate data of a new CBG for the HARQ ID, or indicate that a CBG for the HARQ ID is not being retransmitted. A bit of a CBG-level NDI field for a HARQ ID maintaining a value of a "0" or maintaining a value of a "1" may indicate a retransmission of data of a CBG for the HARQ ID, which may include a CBG-level retransmission, and may be accompanied by a CBG-level grant. In examples where toggling behavior is used to indicate whether a TB or CBG is associated with new data, retransmission, or no retransmission, an initial value of the NDI field (e.g., before a toggling behavior of the NDI field occurs) may be associated with a particular indication (e.g., "0" indicating a retransmission, or "1" indicating either new data or no retransmission).

The NDI signaling arrangements may be identified based at least in part on implicit or explicit signaling from the first device indicating a configuration for providing NDIs with a data transmission. The identified NDI signaling arrangements may be associated with a semi-static configuration, or an indication that accompanies a particular data transmission (e.g., in physical control channel indications or one or more grants). In some examples the first device may determine an NDI signaling arrangement (e.g., based on the capabilities of the second device, or the retransmission requirements of a particular data transmission), which may subsequently be signaled explicitly or implicitly by the first device (e.g., as a semi-static configuration, or signaling accompanying the NDI). In some examples, an NDI signaling arrangement may be selected in order to balance the utilization of TB-level NDIs and CBG-level NDIs, and the signaling required for the particular NDI signaling arrangement, in the context of available communications resources and various network conditions.

By multiplexing CBG-level and TB-level NDIs in accordance with aspects of the present disclosure, a wireless communications system can support more efficient retransmission communication by reducing redundant retransmissions of CBG-level data (e.g., a redundant retransmission of a CBG that was received successfully, but accompanied a CBG of the same TB that was not received successfully), while also utilizing fewer communications resources than CBG-level NDIs alone. In some examples, an NDI signaling arrangement may selected in order to balance the utilization of TB-level NDIs and CBG-level NDIs, and the signaling required for the particular NDI signaling arrangement, in the context of available communications resources and various network conditions.

Aspects of the disclosure are initially described in the context of a wireless communications system. Aspects of the disclosure are further illustrated by and described with reference to apparatus diagrams, system diagrams, examples of NDI signaling arrangements, and flowcharts that relate to multiplexing CBG-level and TB-level NDIs.

Although examples of multiplexed CBG-level and TB-level NDIs are described in the context of retransmissions from a base station 105 to a UE 115 (e.g., downlink data retransmissions), multiplexed CBG-level and TB-level NDIs in accordance with the present disclosure may also be performed in the context of retransmissions from a UE 115 to a base station 105 (e.g., uplink data retransmissions), or in the context of retransmissions from a first UE 115 to a second UE 115 (e.g., peer-to-peer data retransmissions, machine-to-machine data retransmissions, mesh network data retransmissions, etc.).

FIG. 1 illustrates an example of a wireless communications system 100 that supports multiplexing CBG-level and TB-level transmission and NDIs in accordance with aspects of the present disclosure. The wireless communications system 100 includes base stations 105, UEs 115, and a core network 130. In some examples, the wireless communications system 100 may be an LTE network, an LTE-A network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, MulteFire, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some examples, the wireless communications system 100 may arrange transmissions according to TBs, which may be associated with an increment of transmission via a protocol layer (e.g., via a MAC layer). In some examples a TB may also correspond to an amount of data transmitted in a particular TTI (e.g., a subframe). A TB may include a plurality of CBs, which are smaller increments of data that form a TB. The transmission of a TB may be assigned to a particular HARQ process having a particular HARQ ID to facilitate transmission and retransmission operations. Communication between devices of the wireless communications system 100 (e.g., between a base station 105 and a UE 115) may be configured according to a finite number of HARQ processes (e.g., identified by unique HARQ IDs), which may be preconfigured and agreed upon between the devices (e.g., based on memory, latency, or other constraints). The HARQ IDs may be cyclically associated with continuous TB transmissions.

The transmission of data associated with a particular TB may be assigned to one of the HARQ process, and may be associated with a HARQ ID and an NDI (e.g., an NDI bit). In some examples a receiving device may compare an value of an NDI field (e.g., an NDI bit) of a present TB (e.g., HARQ ID) with the value of the NDI field of a previous TB (e.g., for the same HARQ ID), and if the value of the NDI field has changed (e.g., "toggled") the receiver may interpret the present TB of the HARQ ID as being a new transmission. If the value of the NDI field has not changed, the receiver may interpret the present TB of the HARQ ID as being a retransmission of the previous TB for the HARQ ID. Transmission or retransmission of the TB may continue until a transmitting device receives an ACK (e.g., a TB-level ACK associated with the HARQ ID) indicating that the TB has been successfully received. Upon receiving an ACK for a TB associated with a given HARQ ID, the HARQ ID may be reassigned to a new TB in a sequence of TBs to be transmitted to a receiving device.

In some examples, a HARQ ID may only be valid for a certain number of retransmission attempts before the HARQ ID is assigned to a TB having different data. For example, for a TB associated with HARQ ID 2, the TB may be successively retransmitted up to six times if a device attempting to transmit the TB associated with HARQ ID 2 continues to receive a NACK from a target device for the TB associated with HARQ ID 2. Following the sixth attempt, according to certain communications protocols, it may not be clear if a subsequently transmitted TB associated with HARQ ID 2 contains the same data (e.g., a retransmission) or new data. Thus, in order to clearly distinguish whether the TB associated with HARQ ID 2 is a retransmission or contains new data, the TB associated with HARQ ID 2 may be transmitted with an NDI.

In some examples, a single physical control channel transmission (e.g., a single PDCCH) may include NDIs or grants for multiple TBs. For some of those TBs, it may be beneficial to perform a CBG-level transmission (e.g., CBG-level retransmission), while other TBs may be transmitted in their entirety (e.g., as a TB-level transmission of new data or a TB-level retransmission of previously-sent data). In accordance with one or more aspects of the present disclosure, resources may be allocated to particular TBs by way of a multiple-TB grant, or multiple grants each associated with a different TB, which may allocate a particular amount of communications resources for each TB.

In some examples, when a number of CBs for a particular HARQ ID is greater than a number of bits available for feedback indications (e.g., ACK/NACK indicators) or indicating whether a transmitted CB includes new data or a retransmission (e.g. CB-level NDIs), bundling may be performed across groups of codeblocks (e.g., CBGs) of that HARQ ID so that such indications fit within the available resources. In a first example of such bundling, a device may determine a bundling size (e.g., a number of CBs per CBG) such that the number of CBGs associated with a particular HARQ ID are less than or equal to the number of feedback or NDI resources for that HARQ ID. The device may accordingly divide the CBs into CBGs of the determined bundle size for that HARQ ID, and provide the CBG-level feedback or NDIs for that HARQ ID on the CBGs having the determined bundle size. In some examples, the bundle size of a last CBG may have fewer than the bundle size number of CBs. For example, for a HARQ ID associated with six CBs and four bits for feedback or NDIs, the CBG bundle size would be two CBs, and the associated feedback or NDIs would use the first three ACK/NACK bits, and may not use the fourth ACK/NACK bit. In another example of bundling, CBGs may be determined (e.g., for a HARQ ID) with two different sizes. For example, for M CBGs of a first size X, and N CBGs of a second size X−1, a total number of CBs in a TB may be equal to M*X+N*(X−1), and a number of feedback indicator or NDI bits may be equal to M+N. In an example with six CBs and four feedback indicator or NDI resources, a CB-to-indicator resource mapping for the six CBs may follow the arrangement given by (CB0+CB1, CB2+CB3, CB4, CB5).

An alternative approach may include using a fixed CBG size and vary the number of bits for different HARQ IDs based on the number of scheduled codeblocks. For example, for CBGs having a size of two CBs each, a data transmission (e.g., a first physical downlink shared channel (PDSCH) transmission) including four CBs may use two feedback indicator or NDI resources, and a data transmission (e.g., a second PDSCH transmission) including six CBs may use three feedback indicator or NDI resources. Since a device transmitting a data transmission may indicate with a bitmap which portions of the data transmission are CBG-level retransmissions, and a device receiving the data transmission may indicate with a bitmap which portions of the data transmission are provided with CBG-level feedback, the devices exchanging information may still be in sync (e.g., as long as there are no false physical downlink control channel (PDCCH) detections).

In accordance with one or more aspects of the present disclosure, devices of the wireless communications system 100 may support multiplexing CBG-level NDIs with TB-level NDIs to support retransmission of data according to TB-level retransmissions, CBG-level retransmissions, or a combination thereof. For example, a device of the wireless communications system 100 (e.g., a UE 115 or a base station 105) may support generating, for a transmission associated with a set of TBs, a bit sequence including TB-level indication (e.g., a TB-level NDI) of whether each TB in a first subset of TBs in the set of TBs includes a retransmission, and CBG-level indication (e.g., a CBG-level NDI) of whether a second subset of TBs in the set of TBs includes a CBG-level retransmission, transmitting at least one grant comprising the bit sequence, and transmitting the transmission associated with the set of TBs in accordance with the bit sequence. Further, a device of the wireless communications system 100 (e.g., a base station 105 or a UE 115) may support receiving a grant comprising a bit sequence including a TB-level indication (e.g., a TB-level NDI) of whether each TB in a first subset of TBs in the set of TBs includes a retransmission, and CBG-level indication (e.g., a CBG-level NDI) of whether a second subset of TBs in the set of TBs includes a CBG-level retransmission, and monitoring for the set of TBs based at least in part on the bit sequence.

By multiplexing CBG-level and TB-level transmission and NDIs in accordance with aspects of the present disclosure, devices of the wireless communications system 100 (e.g., base stations 105 or UEs 115) can support more efficient retransmission communication by reducing redundant retransmissions of CBG-level data (e.g., a redundant retransmission of a CBG that was received successfully, but accompanied a CBG of the same TB that was not received successfully), or by eliminating the decoding of portions of TBs that include CBGs that have already been successfully received. Such multiplexing may also utilize fewer communications resources than CBG-level NDIs alone. In some examples, an NDI signaling arrangement may selected in order to balance the utilization of TB-level NDIs and CBG-level NDIs, and the signaling required for the particular NDI signaling arrangement, in the context of available communications resources and various network conditions.

Figure 2:
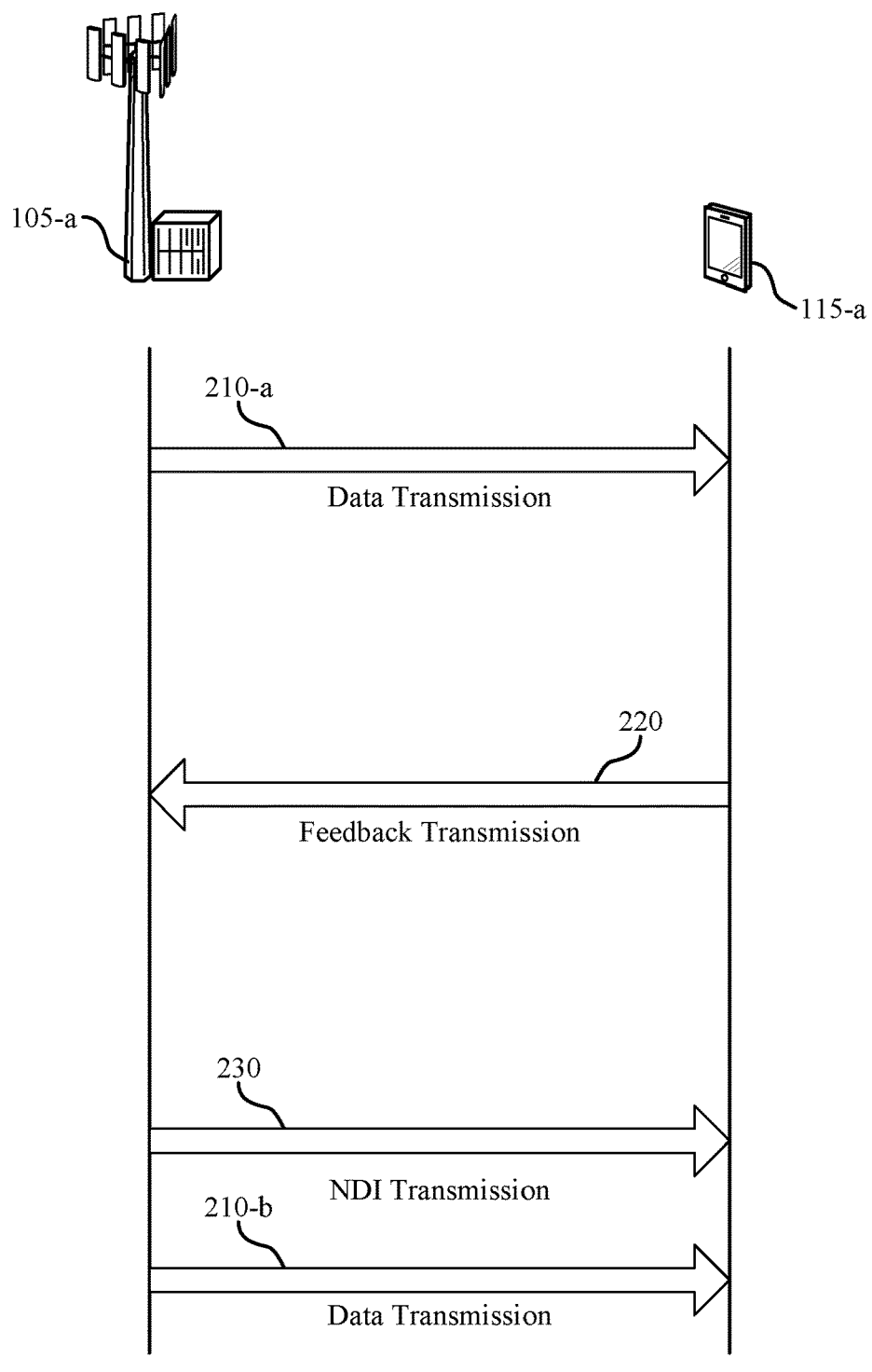
FIG. 2 illustrates an example of a wireless communications system that supports multiplexing CBG-level and TB-level transmission and NDIs in accordance with aspects of the present disclosure.

FIG. 2 illustrates an example of wireless communication 200 that supports multiplexing CBG-level and TB-level transmission and NDIs in accordance with aspects of the present disclosure. In some examples, wireless communication 200 may implement aspects of wireless communications system 100. Wireless communication 200 may include communications between a base station 105-a and a UE 115-a, which may be examples of the corresponding devices described with reference to FIG. 1.

A first device (e.g., base station 105-a) may transmit a first data transmission 210-a to a second device (e.g., UE 115-a), which may indicate a number of HARQ IDs (e.g., associated with the transmission of particular TBs) included in the data transmission 210-a. In response, the second device may provide a feedback transmission 220 to the first device indicating which portions of the data transmission 210 were successfully received (e.g., according to the HARQ IDs indicated by the first device). For example, the UE 115-a may provide feedback transmission 220 that includes CBG-level feedback (e.g., ACK/NACK) for at least a portion of the first data transmission 210-a, identifying, at a CBG-level, that at least one CBG was not successfully received. The first device may process the feedback transmission 220, and accordingly may prepare a second data transmission 210-b, including new data transmissions, retransmissions, or various combinations thereof, based at least in part on processing the feedback transmission 220.

In accordance with one or more aspects of the present disclosure, the first device may also prepare and transmit an NDI transmission 230, which may be associated with the second data transmission 210-b, and may provide TB-level and CBG-level indications (e.g., by HARQ ID) of whether the second data transmission 210-b includes TBs associated with TB-level new data or retransmission, CBGs associated with CBG-level new data or retransmission, or various combinations thereof. The NDI transmission 230 may be included in control signaling such as one or more grants (e.g., downlink grants) associated with the second data transmission 210-a, or other physical control channel signaling (e.g., PDCCH indicators or other downlink control information (DCI)), which in various examples may be transmitted in a single TTI (e.g., a single subframe), or distributed across multiple TTIs (e.g., multiple subframes, which may or may not be adjacent in time or frequency). Although not shown, the first data transmission 210-a may also be associated with an NDI transmission 230, indicating whether the first data transmission 210-b includes TBs associated with TB-level new data or retransmission, CBGs associated with CBG-level new data or retransmission, or various combinations thereof.

The NDI transmission 230 may be provided in accordance with a configuration of the second data transmission 210-a, and an availability of resources for the NDI transmission 230. For example, in unlicensed operation, there may be uncertainty regarding when the UE 115-a may send the feedback transmission 220, or when the base station 105-a can send the second data transmission 210-b (e.g., for the transmission of new data, retransmissions, or combinations thereof), because an unlicensed frequency band may be shared among various devices (e.g., between different operators, or other radio access technologies). Thus, the UE 115-a or the base station 105-a may be required to perform an LBT procedure before using resources of an unlicensed radio frequency spectrum for transmitting the feedback transmission 220 or the second data transmission 210-b. When the feedback transmission 220 includes feedback for multiple HARQ processes (e.g., multiple HARQ IDs) being multiplexed in a single subframe, or when the base station 105-*a* receives multiple feedback transmissions 220 across multiple subframes, the requirement to perform an LBT procedure may therefore lead to overlapping occasions to transmit the feedback transmission 220 or the second data transmission 210-*b*. A solution to accommodate this approach is to send feedback (e.g., in the feedback transmission 220) or retransmissions (e.g., in the second data transmission 210-*b*) for multiple HARQ processes (e.g., all of, or a subset of the HARQ IDs) in the same subframe as a transmission opportunity associated with the LBT procedure. This may result in the feedback transmission 220 including feedback for a number of HARQ IDs being multiplexed and transmitted in a single subframe, or the second data transmission 210-*b* including retransmissions for a number of HARQ IDs being multiplexed and transmitted in a single subframe. In other words the base station 105-*a* or the UE 115-*a* may perform transmissions opportunistically, which may include multiplexing information for multiple HARQ IDs.

A wireless communications system in accordance with aspects of the present disclosure may support CB-level grants, but providing NDIs for each CB of a TB may substantially increase NDI overhead as compared with providing TB-level NDIs. Further, since the number of CBs may be dynamic (e.g., based on TB size scheduled in a physical control channel), reserving resources for a worst-case NDI scenario (e.g., reserving resources to accommodate NDIs for every CB associated with the number of HARQ IDs) may be an inefficient use of communications resources. Thus, in accordance with one or more aspects of the present disclosure, CBG-level NDIs may be sent for at least subset of the second data transmission 210-*a*.

In some examples, the UE 115-*a* may receive control information (e.g., from the base station 105-*a*, which may include an RRC configuration, or various physical control channel signaling), indicating that the base station 105-*a* will provide such CBG-level NDIs (e.g., CBG-level NDIs multiplexed with TB-level NDIs for at least some of the HARQ processes of a data transmission 210). In some examples the control information may specify a number of NDI resources (e.g., a number of bits) to use for an retransmission process or for a particular HARQ ID, or a set of grants corresponding to a set of retransmission processes, or a number of retransmission processes and an NDI identifier corresponding to each retransmission process, or a start location and number of bits, or a number of bits for CBG-level NDIs for a particular retransmission process of a plurality of retransmission processes, or any combination thereof.

An indication of the TBs of a data transmission 210 for which CBG-level NDIs are sent (e.g., an indication of the HARQ IDs associated with CBG-level NDIs) may be communicated at least partly through a bit sequence, a bit map, an index, an order in which retransmissions appear in an NDI transmission 230, or various combinations thereof. A bitmap or size of an index may be based on a number of retransmissions in an associated data transmission 210, in which case the bitmap or size of index of the NDI transmission 230 may be variable. In some examples a bitmap or size of index may be based on the number of TBs in an associated data transmission 210, in which case the bitmap or size of index of the NDI transmission 230 may be fixed (e.g., according to a semi-static configuration). In some examples a set of bitmaps may be included in a bit sequence to indicate TB-level grants for a subset of TBs (e.g., a subset of HARQ IDs) and CBG-level HARQ retransmission grants for a different subset of TBs (e.g., a different subset of HARQ IDs). In some examples the TB-level grants may indicate whether a respective TB (e.g., a respective HARQ ID) in a subset of TBs (e.g., a subset of HARQ IDs) includes a TB-level retransmission. In some examples a bitmap may be included to indicate that each TB in a subset of TBs (e.g., each HARQ ID in a subset of HARQ IDs) is associated with a CBG-level retransmission grant and that each TB in a different subset of TBs (e.g., each HARQ ID in a different subset of HARQ IDs) is associated with a TB-level grant for a new TB transmission.

Bit sequences used for the NDI transmission 230 may be arranged in various NDI signaling arrangements, including those described herein. A bit sequence may include various subsequences, which may include a subsequence for providing TB-level NDIs, a subsequence for providing CBG-level NDIs, a subsequence providing a bitmap to indicate which TBs or HARQ IDs are being provided with CBG-level NDIs, a subsequence for providing an index to indicate which TBs or HARQ IDs are being provided with CBG-level NDIs, a subsequence for parity bits, or various combinations thereof, according to a particular NDI signaling arrangement. Further, in various examples a subsequence may be arranged in non-consecutive bits. In some NDI signaling arrangements for the NDI transmission 230, TB-level NDIs may be transmitted for all TBs or HARQ IDs of an associated data transmission 210, or TB-level NDIs may be sent only for a subset of the TBs or HARQ IDs of an associated data transmission 210 for which CBG-level NDIs are not sent. In some examples the selected retransmission method (e.g., according to a selected NDI signaling arrangement of the NDI transmission 230) may be a function of total number of NDI bits for an NDI transmission 230, or a total number of TBs or HARQ IDs in an associated data transmission 210, or a number of retransmissions being transmitted in an associated data transmission 210, or a CBG size, or a combination thereof.

In various examples, an NDI may be based on the value of an NDI field (e.g., of a bit sequence), or a transition (e.g., "toggle") of a value of an NDI field. For example, as indicated by a particular NDI signaling arrangement, a value of "1" in a portion of the bit sequence (e.g., a subsequence) may indicate new data for a particular TB or CBG, and a value of "0" in the portion of the bit sequence may indicate a retransmission for a particular TB or CBG. In some examples of CBG-level NDIs, a value of "0" may indicate a retransmission (e.g., in response to an indication that the CBG had not been successfully received) and may be associated with a resource grant for the respective CBG, and a value of "1" may indicate no retransmission for the respective CBG (e.g., in response to an indication that the CBG had been successfully received), and may not be associated resource grant for the respective CBG.

In another example, an indication of new data or retransmission may be inferred from a toggling behavior of an NDI field of a bit sequence, where a change in value of an NDI field may provide an indication of new data or retransmission. For example, a bit of a TB-level NDI field (e.g., of a bit sequence) for a HARQ ID changing from a "0" to a "1" or from a "1" to a "0" may indicate data of a new TB for the HARQ ID. A bit of a TB-level NDI field for a HARQ ID maintaining a value of a "0" or maintaining a value of a "1" may indicate a retransmission of data of a TB for the HARQ-ID, which may include a TB-level retransmission or a CBG-level retransmission, and may be accompanied by a TB-level grant or a CBG-level grant. Likewise, a bit of a CBG-level NDI field for a HARQ ID changing from a "0" to a "1" or from a "1" to a "0" may indicate data of a new CBG for the HARQ ID, or indicate that a CBG for the HARQ ID is not being retransmitted. A bit of a CBG-level NDI field for a HARQ ID maintaining a value of a "0" or maintaining a value of a "1" may indicate a retransmission of data of a CBG for the HARQ ID, which may include a CBG-level retransmission, and may be accompanied by a CBG-level grant. In examples where toggling behavior is used to indicate whether a TB or CBG is associated with new data, retransmission, or no retransmission, an initial value of the NDI field (e.g., before a toggling behavior of the NDI field occurs) may be associated with a particular indication (e.g., "0" indicating a retransmission, or "1" indicating either new data or no retransmission).

In some examples the transmission resources allocated for the NDI transmission 230 may be fixed, and the transmitting device (e.g., the base station 105-a) may need to determine which TB (e.g., which HARQ ID) of the associated data transmission 210 to send CBG-level retransmissions for (e.g., in the data transmission 210-b), and accordingly which CBGs to provide CBG-level NDIs for in the NDI transmission 230. For example, if there are N resources for CBG-level NDIs, but the UE 115-a has indicated more than N TBs (e.g., more than N HARQ IDs) for which CBG-level retransmission would help (e.g., more than N TBs or HARQ IDs associated with at least one successfully acknowledged CBG in the feedback transmission 220 and at least one unsuccessfully acknowledged CBG in the feedback transmission), the base station 105-a may need to select which of the TBs or HARQ IDs associated with unsuccessful TB-level transmission (e.g., TB-level NACK as indicated by a feedback transmission 220) to send CBG-level retransmissions for in the data transmission 210-b, and accordingly which CBGs to provide CBG-level NDIs for in the NDI transmission 230.

In some examples, the base station 105-a may make a selection of TBs (e.g., selecting certain HARQ IDs) for CBG-level retransmission and NDI based at least in part on reducing or minimizing wasted transmission resources. For example, for each TB or HARQ ID of the data transmission 210-b, the base station 105-a may determine the size of codeblocks for retransmission as being equal to the sum of sizes of CBs or CBGs of the TB or HARQ ID for which CB-level or CBG-level NACKs were received. The base station 105-a may subsequently prepare CBG-level retransmission for TBs or HARQ IDs having at least one CBG-level NACK, starting with the TB or HARQ ID with the smallest size of negatively acknowledged codeblocks. In other words, the base station 105-a may prioritize providing CBG-level retransmission and NDI for those TBs or HARQ IDs having at least one CBG-level NACK, but a relatively low ratio of CBG-level NACKs, to reduce or minimize the retransmission and NDIs of CBGs associated with a successfully acknowledged reception by the UE 115-a.

In some examples, the resources for the NDI transmission 230 may be allocated by the base station 105-a. An amount of communications resource allocated to NDI signaling (e.g., a number of NDI bits) may be dynamic based on the amount of data in the associated data transmission 210 (e.g., a number of allocated PDCCH transmissions, or a number of downlink grants) or may be semi-static (e.g., determined based on the RRC configuration between the base station 105-a and the UE 115-a). For example, the number N of CBG-level NDI resources may be dynamically changed by the base station 105-a, and indicated to the UE 115-a by physical control channel signaling (e.g., PDCCH indications or other DCI). In some examples a set of NDI resources may be selected based on the number of NDI bits required for the NDI transmission 230. Alternatively, the resources allocated for the NDI transmission 230 may be fixed, but the base station 105-a may communicate a different number of bits by changing the coding rate for the NDI transmission 230.

In accordance with one or more aspects of the present disclosure, the base station 105-a may determine and transmit a multiple-TB grant (e.g., a multiple-TB downlink (DL) grant), or a separate grant for each TB or HARQ ID (e.g., multiple DL grants, one for each TB or HARQ ID) for the data transmission 210-b. The base station 105-a may determine a resources allocation for the transmission of each of the TBs or HARQ IDs according to various methods. For example, the resource allocation by the base station 105-a may be the same for each of the TBs or HARQ IDs of the data transmission 210-b, independent of how many CBGs of the TB or HARQ ID are transmitted (e.g., whether all CBGs, or a portion of the CBGs, are being retransmitted, or whether the TB associated with a HARQ ID is entirely new data). In another example, the resources allocated for a particular TB or HARQ ID may be scaled proportionally based on a ratio of CBGs of the TB or HARQ ID that are to be transmitted (e.g., retransmitted) to a total number of CBGs in that TB or HARQ ID. More generally, for those TBs or HARQ IDs that are associated with some subset of CBGs that are being transmitted (e.g., retransmitted), the resources allocated to that TB or HARQ ID may be reduced in comparison to a TB or HARQ ID that is associated with having all CBGs transmitted (e.g., a TB or HARQ ID having all CBGs retransmitted, or a TB associated with a HARQ ID being transmitted for the first time as new data).

Figure 3:
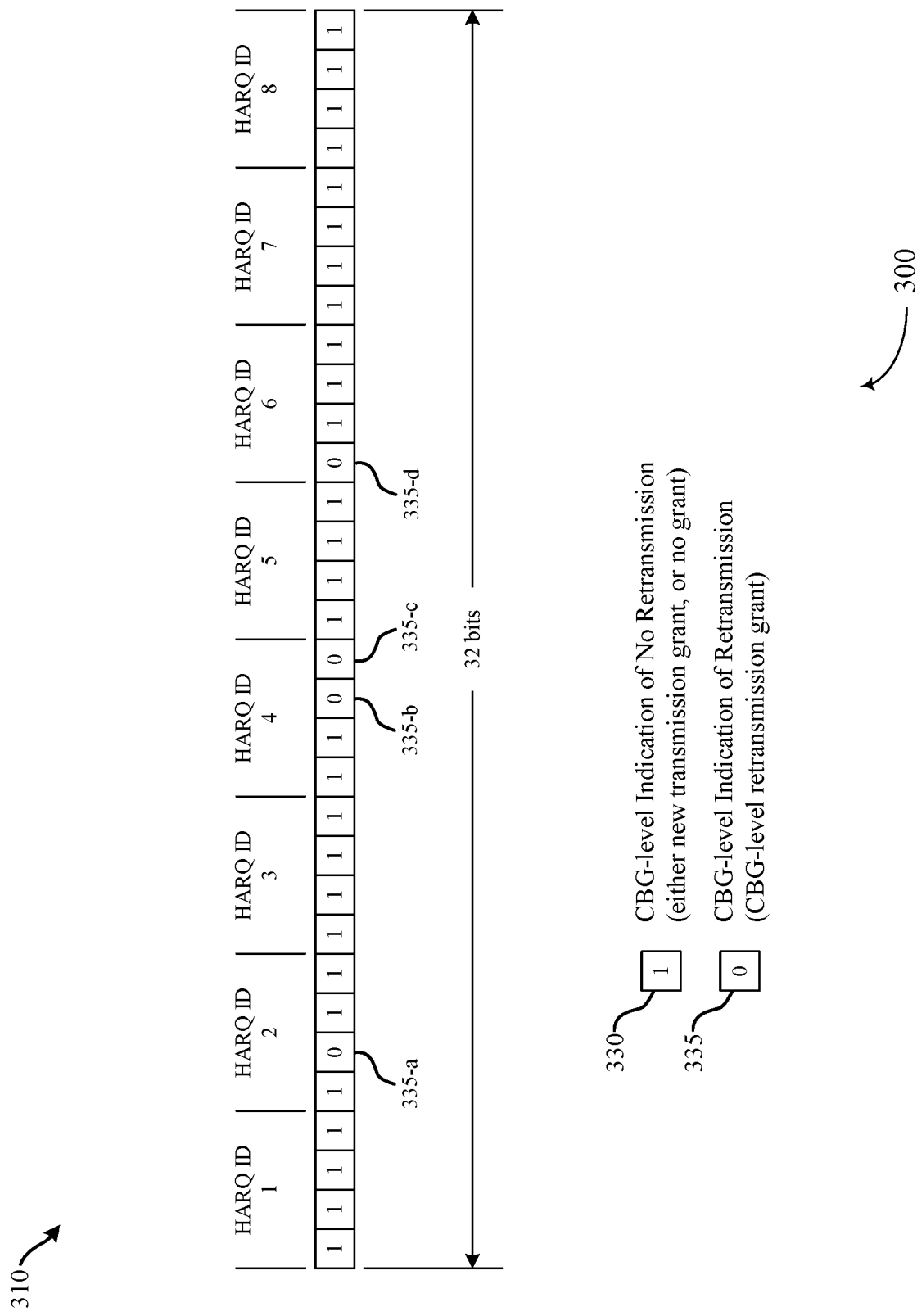
FIG. 3 illustrates an example of an NDI signaling arrangement that supports multiplexing CBG-level and TB-level transmission and NDIs in accordance with aspects of the present disclosure.

FIG. 3 illustrates an example of an NDI signaling arrangement 300 that supports multiplexing CBG-level and TB-level transmission and NDIs in accordance with aspects of the present disclosure. In some examples, the NDI signaling arrangement 300 may implement aspects of wireless communications system 100, or wireless communication 200. For example, NDI signaling arrangement 300 may be one example for providing an NDI transmission 230 associated with a data transmission 210, as described with reference to FIG. 2 (e.g., when transmitting a data transmission 210 of eight HARQ IDs, each associated with a TB having 4 CBGs). The NDI signaling arrangement 300 includes a bit sequence 310, which may include a combination of CBG-level indications of no retransmission 330 and CBG-level indications of retransmission 335, each of which may be referred to as NDIs. In various examples the bit sequence 310 may accompany a data transmission 210, and may be included in control signaling associated with the data transmission 210 (e.g., in a grant, or other physical control channel indications). Although the CBG-level NDIs are shown with particular values (e.g., 0 or 1), in some examples the described CBG-level NDIs may be a result of determining whether an associated NDI field of a bit sequence has a value that toggled (e.g., whether an associated NDI field of the bit sequence transitioned from 0 to 1, or from 1 to 0, which may provide an indication of no retransmission such as new data, or a lack of an associated transmission or grant).

In NDI signaling arrangement 300, the bit sequence 310 may include CBG-level NDIs for each of eight HARQ IDs associated with 4 CBGs. Accordingly, the bit sequence 310 may be associated with 32 NDI bits for providing CBG-level NDIs for each of the 32 total CBGs associated with the eight HARQ IDs. In the bit sequence 310, the first CBG-level indication of retransmission 335-a may indicate that a second CBG of a TB associated with HARQ ID 2 is a CBG-level retransmission, the second CBG-level indication of retransmission 335-b may indicate that a third CBG of a TB associated with HARQ ID 4 is a CBG-level retransmission, the third CBG-level indication of retransmission 335-*c* may indicate that a fourth CBG of the TB associated with HARQ ID 4 is a CBG-level retransmission, and the fourth CBG-level indication of retransmission 335-*d* may indicate that a first CBG of a TB associated with HARQ ID 6 is a CBG-level retransmission.

In some examples, the CBG-level indications of no retransmission 330 may be interpreted according to not only the NDI for a particular CBG, but also according to the NDIs of other CBGs of a TB associated with a HARQ ID. For example, HARQ IDs 1, 3, 5, 7, and 8 may have CBG-level indications of no retransmission for each of the CBGs of the respective HARQ ID. Accordingly, these portions of the bit sequence 310 may indicate that TBs associated with HARQ IDs 1, 3, 5, 7, and 8 are new TB-level data transmissions (e.g., because all the CBGs for that HARQ ID have an indication of no retransmission), and accordingly HARQ IDs 1, 3, 5, 7, and 8 may also be associated with TB-level resource grants. For HARQ IDs 2, 4, and 6, each associated with at least one CBG-level indication of retransmission 335, the CBG-level indications of no retransmission 330 may indicate that the respective CBGs for TBs associated with those HARQ IDs are not being retransmitted, and therefore those CBGs or the respective HARQ IDs may not be associated with a resource grant (e.g., no CBG-level grants) for retransmission.

The approach of NDI signaling arrangement 300 may minimize the retransmission in a wireless communications system, because each of the CBGs of a HARQ ID may be associated with a unique NDI in the bit sequence 310. Devices of a wireless communications system may determine that the NDI signaling arrangement 300 is appropriate when TB-level retransmission should be avoided, or when other NDI signaling arrangements are less efficient for indicating the particular arrangement of CBG-level and TB-level transmissions of a data transmission 210. In some examples, a base station 105 may transmit an indication of the use of the NDI signaling arrangement 300 to a UE 115 so that the UE 115 may process the bit sequence 310, or a UE 115 may already be configured to process the bit sequence 310 properly (e.g., as a semi-static configuration)

In some conditions, a data transmission 210 may be associated with an NDI transmission 230 that includes multiplexed TB-level NDIs for some or all of the TBs (e.g., HARQ IDs) of a data transmission 210 and CBG-level NDIs for a subset of the TBs (e.g., HARQ IDs) of the data transmission 210, which may be accomplished using multiplexing NDI signaling arrangements such as those described with reference to FIGS. 4 through 7.

Figure 4:
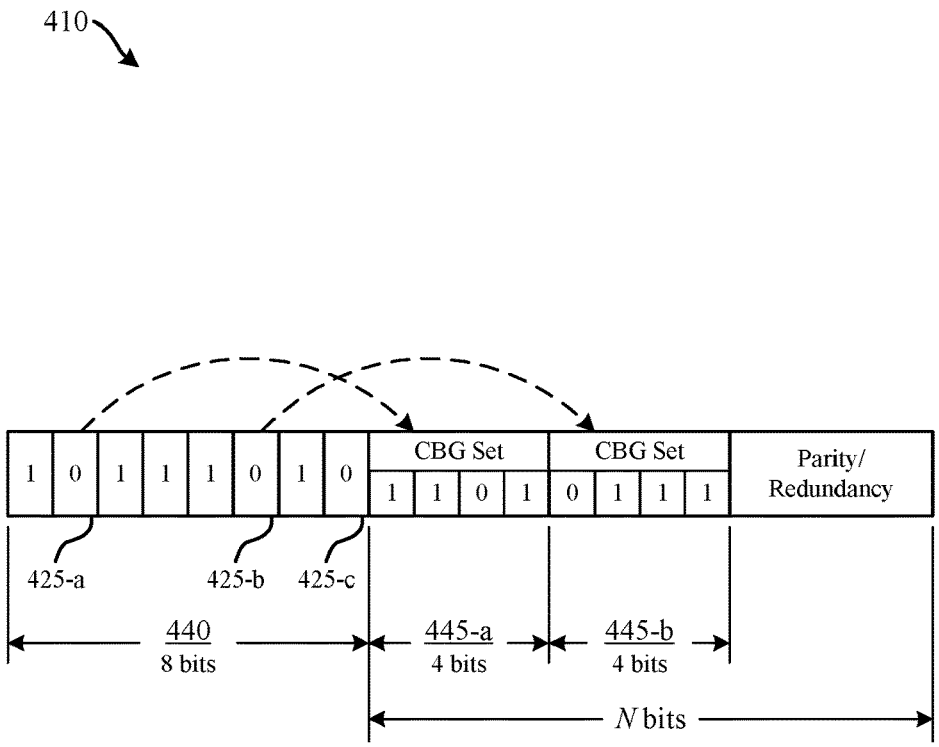
FIG. 4 illustrates an example of an NDI signaling arrangement that supports multiplexing CBG-level and TB-level transmission and NDIs in accordance with aspects of the present disclosure.

FIG. 4 illustrates an example of an NDI signaling arrangement 400 that supports multiplexing CBG-level and TB-level transmission and NDIs in accordance with aspects of the present disclosure. In some examples, NDI signaling arrangement 400 may implement aspects of wireless communications systems 100, or wireless communication 200. For example, NDI signaling arrangement 400 may be one example of providing an NDI transmission 230 associated with a data transmission 210, as described with reference to FIG. 2 (e.g., when transmitting a data transmission 210 having a set of eight HARQ IDs each associated with a TB having 4 CBGs). The NDI signaling arrangement 400 includes a bit sequence 410, which may include a combination of TB-level indications of new data 420, TB-level indications of retransmission 425, CBG-level indications of no retransmission 430 (which may not be associated with a CBG-level retransmission grant), and CBG-level indications of retransmission 435 (which may be associated with a CBG-level retransmission grant), each of which may be referred to as an NDI. In various examples the bit sequence 410 may accompany a data transmission 210, and may be included in control signaling associated with the data transmission 210 (e.g., in a grant, or other physical control channel indications).

According to the example of NDI signaling arrangement 400, the bit sequence 410 may include a TB-level NDI set 440 (e.g., a subsequence), which may be a fixed resource (e.g., eight bits) that provides a TB-level indications (e.g., of whether the TB includes a retransmission) for each of the TBs associated with a data transmission 210 (e.g., the eight TBs, associated with eight unique HARQ IDs). In the depicted example, the TB-level NDI set 440 includes bit values of "10111010", indicating that the second, sixth, and eight HARQ-IDs include a retransmission, and the remaining HARQ-IDs include new data.

The bit sequence 410 may also include a fixed set of resources (e.g., N bits) allocated to CBG-level NDIs for the data transmission 210, and CBG-level feedback may be provided according to CBG-level NDI sets 445 (e.g., CBG-level NDI set 445-*a* associated with the TB-level indication of retransmission 425-*a*, and CBG-level NDI set 445-*b* associated with the TB-level indication of retransmission 425-*b*). In the example of NDI signaling arrangement 400, there may only be enough resources to support CBG-level NDI for two HARQ IDs, in which case the TB-level indication of retransmission 425-*c* may not be associated with a CBG-level NDI set 445. Therefore a data transmission 210 associated with the bit sequence 410 may include a CBG-level retransmission of the indicated CBGs of the second and sixth HARQ IDs, and a TB-level retransmission for the TB associated with the eighth HARQ ID.

Thus, the NDI signaling arrangement 400 may be an example of a fixed-resource arrangement, where certain resources are allocated to TB-level NDIs, and certain resources are allocated to CBG-level NDIs. In various examples, the fixed resources may be semi-statically configured (e.g., specifically associated with the use of the NDI signaling arrangement 400, or configured as part of a connection establishment between a UE 115 and a base station 105, such as an RRC configuration), or may be dynamically configured (e.g., according to specific allocation signaled by a base station and associated with a data transmission 210, such as a grant or other physical control channel indications). In the event that all of the resources allocated to CBG-level NDIs are not required for CBG-level indications, any remaining resources may be set to dummy bits, or redundancy bits, or a type of parity check bits to improve coding rate associated with the bit sequence 410. For example, the NDI signaling arrangement 400 may include a value for a parity check bit in the bit sequence based at least in part on the first subsequence (e.g., a function of TB-level NDI set 440), or the second subsequence (e.g., a function of one or more of the CBG-level NDI sets 445), or any combination thereof. Accordingly, a device receiving the bit sequence 410 may generate an error detection decision based at least in part on processing a value for a parity check bit in the bit sequence that is based at least in part on the first subsequence, or the second subsequence, or both.

In some examples, CBG-level retransmission or NDIs may be provided in the order of HARQ IDs associated with a TB-level indication of retransmission 425 (e.g., in the order of TB-level indications of retransmission 425-*a*, 425-*b*, and 425-*c*). In some examples the bit sequence 410 may further include additional bits to indicate that order of CBG-level retransmission or NDIs is in a reverse order of HARQ ID (e.g., in the order of TB-level indications of retransmission 425-c, 425-b, and 425-a), or skips the first M TB-level indications of retransmission 425. If resources allocated for CBG-level retransmission or NDIs are insufficient to transmit CBG-level retransmission or NDIs for all HARQ IDs associated with a TB-level indication of retransmission 425, certain HARQ IDs associated with a TB-level indication of retransmission 425 will not be given CBG-level retransmission or NDIs. In another example, the bit sequence 410 may include an index that identifies the TBs for which CBG-level retransmission and NDIs are provided, or an index indicating the HARQ ID of the TBs for which CBG-level retransmission and NDIs are provided, and in some examples the index may have a fixed bit width.

Because the example of NDI signaling arrangement 400 is associated with fixed resource allocations, the NDI signaling arrangement 400 may be associated with relatively low overhead (e.g., relatively low signaling associated with the allocation of resources, or signaling for decoding the bit sequence 410).

Although the TB-level NDIs are shown with particular values (e.g., 0 or 1 for each HARQ ID), in some examples the TB-level NDIs may be a result of determining whether an associated NDI field of the TB-level NDI set 440 for a particular HARQ ID has a value that toggled (e.g., if an associated TB-level NDI field transitioned from 0 to 1, or from 1 to 0, which may provide an indication of new TB-level data for the respective HARQ ID, or no transition, which may provide an indication that at least a portion of the respective HARQ ID is associated with a retransmission). Similarly, although the CBG-level NDIs are shown with particular values (e.g., 0 or 1), in some examples the CBG-level NDIs may be a result of determining whether an associated NDI field of a CBG-level NDI set 445 has a value that toggled (e.g., if an associated CBG-level NDI field transitioned from 0 to 1, or from 1 to 0, which may provide an indication of no CBG-level retransmission for the respective HARQ ID, or no transition, which may provide an indication that the respective CBG of the HARQ ID is associated with a CBG-level retransmission).

For either TB-level NDIs or CBG-level NDIs, an initial value (e.g., prior to an opportunity for toggling) of an NDI field of the bit sequence 410 may itself provide an indication of new data or retransmission. For example, an initial value of "0" may indicate a retransmission, or an initial value of "1" may indicate new data or no retransmission. In the case of CBG-level NDIs, NDI fields for an initial CBG-level NDI set 445 for a given HARQ ID, upon a first TB-level indication of retransmission 425 for the given HARQ ID, may also be set according to initial values (e.g., an initial value of "0" may indicate a retransmission, or an initial value of "1" may indicate no retransmission). In some examples, upon a TB-level indication of new data 420 for that HARQ ID, the NDI fields of the CBG-level NDI set 445 may be reset such that new "initial values" may be determined for a CBG-level NDI set 445 upon a subsequent TB-level indication of retransmission 425 for that HARQ ID. In some examples, upon a TB-level indication of new data 420 for that HARQ ID, the NDI fields of the CBG-level NDI set 445 may not be reset (e.g., may be stored), such that toggling behavior may be determined for a CBG-level NDI set 445 upon a subsequent TB-level indication of retransmission 425 for that HARQ ID. Thus, various examples of multiplexing CBG-level and TB-level NDIs may employ various examples of indications (e.g., by value, or by toggling behavior, or a combination thereof) to indicate new data, retransmission, or no retransmission.

Figure 5:
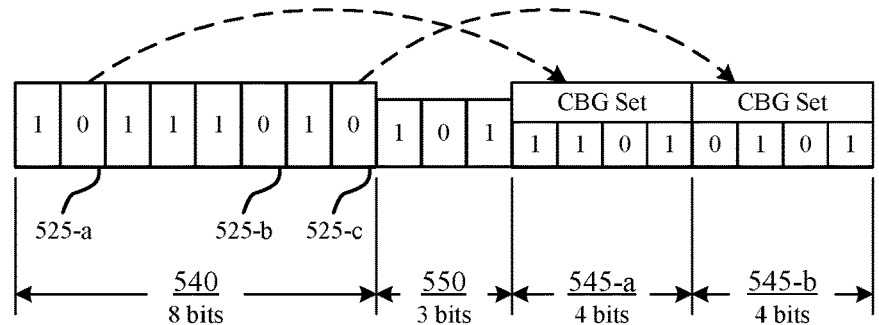
FIG. 5 illustrates an example of an NDI signaling arrangement that supports multiplexing CBG-level and TB-level transmission and NDIs in accordance with aspects of the present disclosure.

FIG. 5 illustrates an example of an NDI signaling arrangement 500 that supports multiplexing CBG-level and TB-level transmission and NDIs in accordance with aspects of the present disclosure. In some examples, NDI signaling arrangement 500 may implement aspects of wireless communications systems 100, or wireless communication 200. For example, NDI signaling arrangement 500 may be one example of providing an NDI transmission 230 associated with a data transmission 210, as described with reference to FIG. 2 (e.g., when transmitting a data transmission 210 of eight HARQ IDs each associated with a TB having 4 CBGs). The NDI signaling arrangement 500 includes a bit sequence 510, which may include a combination of TB-level indications of new data 520, TB-level indications of retransmission 525, CBG-level indications of no retransmission 530 (which may not be associated with a CBG-level retransmission grant), and CBG-level indications of retransmission 535 (which may be associated with a CBG-level retransmission grant), each of which may be referred to as an NDI. In various examples the bit sequence 510 may accompany a data transmission 210, and may be included in control signaling associated with the data transmission 210 (e.g., in a grant, or other physical control channel indications).

According to the example of NDI signaling arrangement 500, the bit sequence 510 may include a TB-level NDI set 540 (e.g., a subsequence), which may be a fixed resource (e.g., eight bits) that provides TB-level indications (e.g., of whether the TB includes a retransmission) for each of the TBs associated with a data transmission 210 (e.g., the eight TBs, associated with the eight unique HARQ IDs).

The bit sequence 510 may also include a bitmap 550 having a length equal to the number of TB-level indications of retransmission 525 (e.g., a length of three bits corresponding to TB-level indications of retransmission 525-a, 525-b, and 525-c). In some examples, the length of the bitmap 550 may be the number of HARQ IDs in the set of HARQ IDs that are associated with a TB-level retransmission generated in response to receiving CBG-level feedback, and the bitmap may allocate a defined amount of resources (e.g., M bits) for CBG-level HARQ retransmission grants for the TB-level retransmissions. In some cases, the defined amount of resources may depend on the number of retransmissions in the set of TBs or HARQ IDs. In some cases, the bitmap 550 may indicate which of the respective TBs or HARQ IDs in the set of TBs or HARQ IDs is a TB-level retransmission that includes a CBG-level HARQ retransmission grant. Thus, the bitmap 550 may have a dynamic length depending on the results of a feedback process associated with a data transmission 210 (e.g., based at least in part on a feedback transmission 220), and may map which of the TB-level indications of retransmission 525 (e.g., which of the HARQ IDs) are associated with CBG-level NDIs.

In the example of bit sequence 510, the bitmap 550 having bit values of "101" identifies that the first TB-level indication of retransmission 525 and the third TB-level indication of retransmission 525 are associated with CBG-level NDIs (e.g., CBG-level NDI set 545-a associated with TB-level indication of retransmission 525-a and CBG-level NDI set 545-b associated with TB-level indication of retransmission 525-c), and no CBG-level NDI set 545 is associated with TB-level indication of retransmission 525-b. In another example, the bit sequence 510 may include an index that identifies the TBs or HARQ IDs for which CBG-level retransmission and NDIs are provided, or an index indicating the HARQ ID of the TBs for which CBG-level retransmission and NDIs are provided, and in some examples the index may have a fixed bit width. In the example of NDI signaling arrangement 500, the bit sequence 510 may accompany a data transmission 210 that includes CBG-level retransmissions for the second and eighth HARQ IDs, and a TB-level retransmission for the sixth HARQ ID.

Thus, the NDI signaling arrangement 500 may be an example of a variable-resource arrangement, where certain resources are allocated in a fixed manner to TB-level NDIs (e.g., the TB-level NDI set 540), and certain resources are allocated in a variable manner to CBG-level NDIs (e.g., the combined feedback of bitmap 550 and CBG-level NDI sets 545-*a* and 545-*b*). The total resources available to a device providing an NDI transmission 230 according to the NDI signaling arrangement 500 may be may be semi-statically configured (e.g., specifically associated with the use of the NDI signaling arrangement 500, or configured as part of a connection establishment between a UE 115 and a base station 105, such as an RRC configuration), or may be dynamically configured (e.g., according to specific allocation signaled with a data transmission 210). Thus, a device providing an NDI transmission 230 may determine the bitmap 550 by selecting CBG-level retransmission and NDIs for certain HARQ IDs based on any of the considerations described herein (e.g., to reduce or minimize the retransmission overhead). In some examples the total resources available to the device providing an NDI transmission 230 according to the NDI signaling arrangement 500 may not be preconfigured, and the device providing the NDI transmission 230 may determine how much of a generally available resource to use for the bit sequence 510 (e.g., based at least in part on a determined MCS, or based on balancing an NDI transmission 230 with other transmissions within the available resource).

Because the example of NDI signaling arrangement 500 is associated with variable resource allocations, the NDI signaling arrangement 500 may be associated with nominally greater overhead (e.g., associated with the bitmap 550 of the bit sequence 510). However, the example of NDI signaling arrangement 500 may provide an improvement in resource utilization efficiency, because resources not required for transmitting the bit sequence 510 may be used for another purpose (e.g., communications other than NDI transmission 230).

Although the TB-level NDIs are shown with particular values (e.g., 0 or 1 for each HARQ ID), in some examples the TB-level NDIs may be a result of determining whether an associated NDI field of the TB-level NDI set 540 for a particular HARQ ID has a value that toggled (e.g., if an associated TB-level NDI field transitioned from 0 to 1, or from 1 to 0, which may provide an indication of new TB-level data for the respective HARQ ID, or no transition, which may provide an indication that at least a portion of the respective HARQ ID is associated with a retransmission). Similarly, although the CBG-level NDIs are shown with particular values (e.g., 0 or 1), in some examples the CBG-level NDIs may be a result of determining whether an associated NDI field of a CBG-level NDI set 545 has a value that toggled (e.g., if an associated CBG-level NDI field transitioned from 0 to 1, or from 1 to 0, which may provide an indication of no CBG-level retransmission for the respective HARQ ID, or no transition, which may provide an indication that the respective CBG of the HARQ ID is associated with a CBG-level retransmission).

For either TB-level NDIs or CBG-level NDIs, an initial value (e.g., prior to an opportunity for toggling) of an NDI field of the bit sequence 510 may itself provide an indication of new data or retransmission. For example, an initial value of "0" may indicate a retransmission, or an initial value of "1" may indicate new data or no retransmission. In the case of CBG-level NDIs, NDI fields for an initial CBG-level NDI set 545 for a given HARQ ID, upon a first TB-level indication of retransmission 525 for the given HARQ ID, may also be set according to initial values (e.g., an initial value of "0" may indicate a retransmission, or an initial value of "1" may indicate no retransmission). In some examples, upon a TB-level indication of new data 520 for that HARQ ID, the NDI fields of the CBG-level NDI set 545 may be reset such that new "initial values" may be determined for a CBG-level NDI set 545 upon a subsequent TB-level indication of retransmission 525 for that HARQ ID. In some examples, upon a TB-level indication of new data 520 for that HARQ ID, the NDI fields of the CBG-level NDI set 545 may not be reset (e.g., may be stored), such that toggling behavior may be determined for a CBG-level NDI set 545 upon a subsequent TB-level indication of retransmission 525 for that HARQ ID. Thus, various examples of multiplexing CBG-level and TB-level NDIs may employ various examples of indications (e.g., by value, or by toggling behavior, or a combination thereof) to indicate new data, retransmission, or no retransmission.

Figure 6:
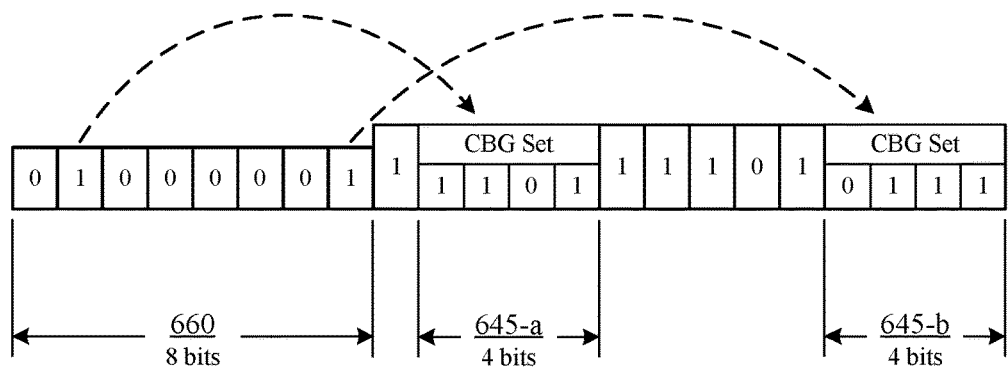
FIG. 6 illustrates an example of an NDI signaling arrangement that supports multiplexing CBG-level and TB-level transmission and NDIs in accordance with aspects of the present disclosure.
Figure 6:
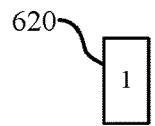
Figure 6:
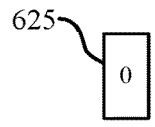
Figure 6:
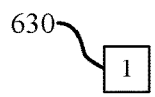
Figure 6:
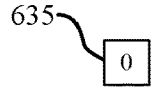

FIG. 6 illustrates an example of an NDI signaling arrangement 600 that supports multiplexing CBG-level and TB-level transmission and NDIs in accordance with aspects of the present disclosure. In some examples, NDI signaling arrangement 600 may implement aspects of wireless communications systems 100, or wireless communication 200. For example, NDI signaling arrangement 600 may be one example of providing an NDI transmission 230 associated with a data transmission, as described with reference to FIG. 2 (e.g., when transmitting a data transmission 210 of eight HARQ IDs each associated with a TB having 4 CBGs). The NDI signaling arrangement 600 includes a bit sequence 610, which may include a combination of TB-level indications of new data 620, TB-level indications of retransmission 625, CBG-level indications of no retransmission 630 (e.g., which may not be associated with a CBG-level retransmission grant), and CBG-level indications of retransmission 635 (e.g., which may be associated with a CBG-level retransmission grant), each of which may be referred to as an NDI. In various examples the bit sequence 610 may accompany a data transmission 210, and may be included in control signaling associated with the data transmission 210 (e.g., in a grant, or other physical control channel indications).

According to the example of NDI signaling arrangement 600, the bit sequence 610 may include a bitmap 660 having a length equal to the number of HARQ IDs in a data transmission 210 (e.g., a length of eight bits). Thus, the bitmap 660 may have a fixed length regardless of the distribution of retransmissions and new data associated with a data transmission 210, and may map which of the TBs or HARQ IDs are associated with CBG-level NDIs. Following the bitmap 660, the bit sequence 610 may include an arrangement of TB-level and CBG-level NDIs in accordance with the bitmap 660.

In the example of bit sequence 610, the bitmap 660 identifies that the second TB (e.g., the second HARQ ID) and the eighth TB (e.g., the eighth HARQ ID) are associated with CBG-level retransmission and NDIs (e.g., according to CBG-level NDI set 645-*a* associated with the second HARQ ID and CBG-level NDI set 645-*b* associated with the eighth HARQ ID). Accordingly, the bit sequence 610 may be arranged to include a TB-level NDI for the first TB or HARQ ID, followed by CBG-level NDIs for the second TB or HARQ ID (e.g., CBG-level NDI set 645-*a*), followed by TB-level NDIs for the third through seventh TB or HARQ ID, and CBG-level NDIs for the eighth TB or HARQ ID (e.g., CBG-level NDI set 645-*b*). More generally, the NDI signaling arrangement 600 may be arranged to include a multiplexing of CBG-level NDI sets 645 for a certain number of TBs or HARQ IDs (e.g., up to some number N as determined by the transmitting device, or some predetermined or otherwise configured number), and TB-level NDIs for the rest of the TBs or HARQ IDs. In the example of NDI signaling arrangement 600, the bit sequence 610 may accompany a data transmission 210 that includes CBG-level retransmissions for the second and eighth HARQ IDs, and a TB-level retransmission for the sixth HARQ ID.

Thus, the NDI signaling arrangement 600 may be an example of a variable-resource arrangement, where certain resources are allocated in a fixed manner to a bitmap (e.g., bitmap 660), and certain resources are allocated in a variable manner to a combination of TB-level and CBG-level NDIs (e.g., the combination of TB-level indications of new data 620, TB-level indications of retransmission 625, and CBG-level NDI sets 645-*a* and 645-*b*). The total resources available to a device providing an NDI transmission 230 according to the NDI signaling arrangement 600 may be may be semi-statically configured (e.g., specifically associated with the use of the NDI signaling arrangement 600, or configured as part of a connection establishment between a UE 115 and a base station 105, such as an RRC configuration), or may be dynamically configured (e.g., according to specific allocation signaled with a data transmission 210, such as a grant or other physical control channel indicators). Thus, a device providing an NDI transmission 230 may determine the bitmap 660 by selecting CBG-level retransmission and NDIs for certain HARQ IDs based on any of the considerations described herein (e.g., to minimize the retransmission overhead). In some examples the total resources available to the device providing an NDI transmission 230 according to the NDI signaling arrangement 600 may not be preconfigured, and the device providing the NDI transmission 230 may determine how much of a generally available resource to use for the bit sequence 610 (e.g., based at least in part on a determined MCS, or based on balancing the NDI transmission 230 with other transmissions within the available resource).

Because the example of NDI signaling arrangement 600 is associated with variable resource allocations, the NDI signaling arrangement 600 may be associated with relatively greater overhead (e.g., associated with the fixed-length bitmap 660 of the bit sequence 610). However, the example of NDI signaling arrangement 600 may provide an improvement in resource utilization efficiency, because resources not required for transmitting the bit sequence 610 may be used for another purpose (e.g., communications other than NDI transmission 230). In comparison with the NDI signaling arrangement 500, for example, the NDI signaling arrangement 600 may utilize more resources for an NDI transmission 230 when there are relatively few TB-level indications of retransmission 625, as a result of the fixed-length bitmap 660. However, as the number of TB-level indications of retransmission 625 increase, the size of the bitmap 550 of the NDI signaling arrangement 500 will increase, and therefore the NDI signaling arrangement 500 may be less favorable (e.g., may utilize more resources for NDI transmission 230 than NDI signaling arrangement 600) in conditions with relatively many TB-level indications of retransmission 525.

Although the TB-level NDIs are shown with particular values (e.g., 0 or 1 for each HARQ ID), in some examples the TB-level NDIs may be a result of determining whether an associated TB-level NDI field of the bit sequence 610 for a particular HARQ ID has a value that toggled (e.g., if an associated TB-level NDI field transitioned from 0 to 1, or from 1 to 0, which may provide an indication of new TB-level data for the respective HARQ ID, or no transition, which may provide an indication that at least a portion of the respective HARQ ID is associated with a retransmission). Similarly, although the CBG-level NDIs are shown with particular values (e.g., 0 or 1), in some examples the CBG-level NDIs may be a result of determining whether an associated NDI field of a CBG-level NDI set 645 has a value that toggled (e.g., if an associated CBG-level NDI field transitioned from 0 to 1, or from 1 to 0, which may provide an indication of no CBG-level retransmission for the respective HARQ ID, or no transition, which may provide an indication that the respective CBG of the HARQ ID is associated with a CBG-level retransmission).

For either TB-level NDIs or CBG-level NDIs, an initial value (e.g., prior to an opportunity for toggling) of an NDI field of the bit sequence 610 may itself provide an indication of new data or retransmission. For example, an initial value of "0" may indicate a retransmission, or an initial value of "1" may indicate new data or no retransmission. In the case of either TB-level or CBG-level NDIs, NDI fields for an initial TB-level NDI or for a CBG-level NDI of a CBG-level NDI set 645 for a given HARQ ID, upon a first TB-level indication of retransmission 625 for the given HARQ ID, may also be set according to initial values (e.g., an initial value of "0" may indicate a retransmission, or an initial value of "1" may indicate new data or no retransmission). In some examples, upon a TB-level indication of new data 620 for that HARQ ID, the NDI field of the TB-level NDI or CBG-level NDIs of a CBG-level NDI set 645 may be reset such that new "initial values" may be determined for TB-level NDI or CBG-level NDI of a CBG-level NDI set 645 upon a subsequent TB-level indication of retransmission 625 for that HARQ ID. In some examples, upon a TB-level indication of new data 620 for that HARQ ID, the NDI fields of the CBG-level NDI set 645 may not be reset (e.g., may be stored), such that toggling behavior may be determined for a TB-level NDI or a CBG-level NDI set 645 upon a subsequent TB-level indication of retransmission 625 for that HARQ ID. Thus, various examples of multiplexing CBG-level and TB-level NDIs may employ various examples of indications (e.g., by value, or by toggling behavior, or a combination thereof) to indicate new data, retransmission, or no retransmission.

Figure 7:
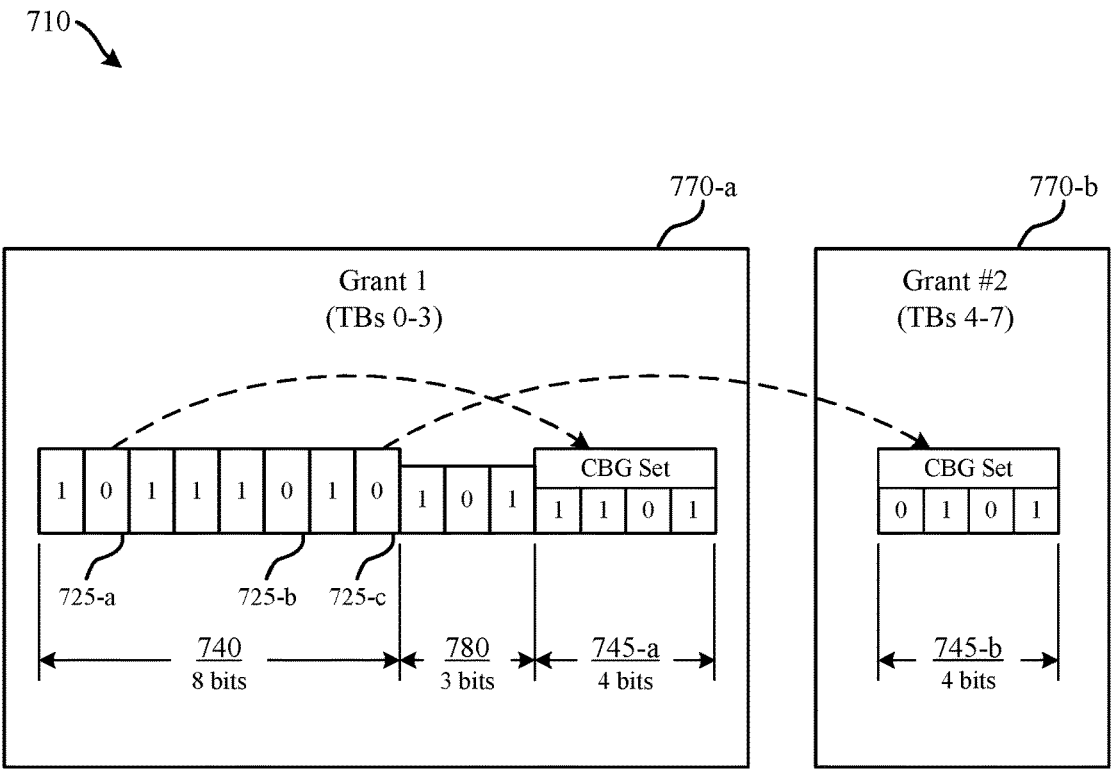
FIG. 7 illustrates an example of an NDI signaling arrangement that supports multiplexing CBG-level and TB-level transmission and NDIs in accordance with aspects of the present disclosure.
Figure 7:
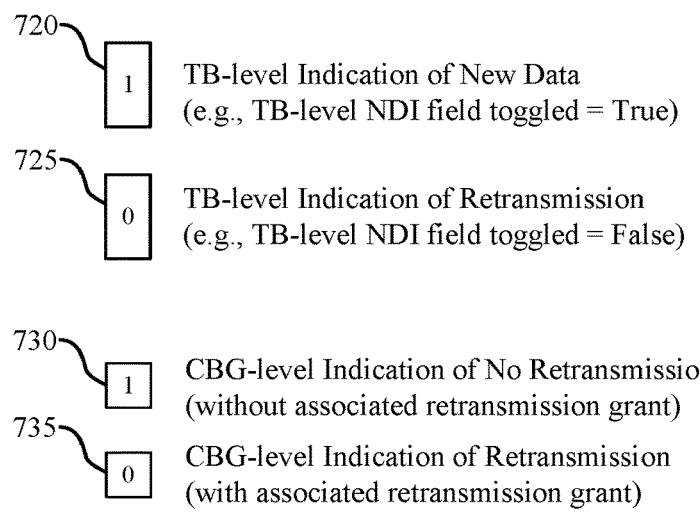

FIG. 7 illustrates an example of an NDI signaling arrangement 700 that supports multiplexing CBG-level and TB-level transmission and NDIs in accordance with aspects of the present disclosure. In some examples, NDI signaling arrangement 700 may implement aspects of wireless communications systems 100, or wireless communication 200. For example, NDI signaling arrangement 700 may be one example of providing an NDI transmission 230 associated with a data transmission 210, as described with reference to FIG. 2 (e.g., when transmitting a data transmission 210 of eight HARQ IDs each associated with a TB having 4 CBGs). The NDI signaling arrangement 700 includes a bit sequence 710, which may include a combination of TB-level indications of new data 720, TB-level indications of retransmission 725, CBG-level indications of no retransmission 730 (which may not be associated with a CBG-level retransmission grant), and CBG-level indications of retransmission 735 (which may be associated with a CBG-level retransmission grant), each of which may be referred to as an NDI. In various examples the bit sequence 710 may accompany a data transmission 210, and may be included in control signaling associated with the data transmission 210.

In the example of NDI signaling arrangement 700, a data transmission 210 may be divided across multiple TTIs (e.g., multiple subframes), and in some examples the bit sequence 710 may also be divided across multiple TTIs. The division of the bit sequence may be accomplished by including different subsequences of the bit sequence 710 in control signaling of the multiple TTIs (e.g., by including the different subsequences in different grants 770, or other physical control channel signaling).

According to the example of NDI signaling arrangement 700, the bit sequence 710 may include a TB-level NDI set 740, which may be a fixed resource (e.g., eight bits) of a first grant 770-a that provides TB-level NDIs for each of the TBs associated with a data transmission 210 (e.g., a data transmission 210 divided across multiple TTIs). The bit sequence 710 may also include a bitmap 780 having a length equal to the number of TB-level indications of retransmission 725 (e.g., a length of three bits corresponding to TB-level indications of retransmission 725-a, 725-b, and 725-c), and the bitmap 780 may also be included in the first grant 770-a. Thus, the bitmap 780 may have a dynamic length depending on the results of a retransmission process associated with a data transmission 210 (e.g., based at least in part on a feedback transmission 220), and may map which of the TB-level indications of retransmission 725 are associated with CBG-level NDIs.

In the example of bit sequence 710, the bitmap 780 identifies that the first TB-level indication of retransmission 725 and the third TB-level indication of retransmission 725 are associated with CBG-level NDIs (e.g., CBG-level NDI set 745-a associated with TB-level indication of retransmission 725-b and CBG-level NDI set 745-b associated with TB-level indication of retransmission 725-c, and no CBG-level NDI set 745 associated with TB-level indication of retransmission 725-b). In another example, the bit sequence 710 may include an index that identifies the TBs or HARQ IDs for which CBG-level retransmission and NDIs are provided, or an index indicating the HARQ ID of the TBs for which CBG-level retransmission and NDIs are provided, and in some examples the index may have a fixed bit width. In the example of NDI signaling arrangement 700, the first grant 770 may accompany a first data transmission 210 that includes CBG-level retransmission for the second HARQ ID, and the second grant 770-b may accompany a second data transmission 210 that includes a TB-level retransmission for the sixth HARQ ID and a CBG-level retransmission for the eighth HARQ ID (e.g., CBG level NDI can come in a different subframe and/or PDCCH where the particular TB is being retransmitted).

In the example of bit sequence 710, the data of the TB associated with the first TB-level indication of retransmission 725-a (e.g., the second HARQ ID) may be transmitted in the same TTI as the first grant (e.g., because the TTI including first grant 770-a also includes the data associated with the first four HARQ IDs). The device receiving the bit sequence 710 may receive and decode the first CBG-level NDI set 745-a with the first grant 770-a (e.g., by decoding a first physical control channel transmission such as a first PDCCH), and determine that the third CBG of the TB associated with the second HARQ ID is included in the same TTI as the first grant 770-a. The receiving device may therefore attempt to receive and decode the retransmitted data of the TB associated with the second HARQ ID (e.g., an amount of data equal to a CBG).

The data of the TB associated with the third TB-level indication of retransmission 725-c (e.g., the eighth HARQ ID) may be transmitted in a subsequent TTI, which is associated with a second grant 770-b (e.g., because the TTI including the second grant 770-b also includes the data associated with the last four HARQ IDs). The device receiving the bit sequence 710 may receive and decode the second CBG-level NDI set 745-b with the second grant 770-b (e.g., by decoding a second physical control channel transmission such as a second PDCCH), and determine that the first and third CBGs of the TB associated with the eighth HARQ ID is included in the same TTI as the second grant 770-b. The receiving device may therefore attempt to receive and decode the retransmitted data of the TB associated with the eighth HARQ ID (e.g., an amount of data equal to two CBGs).

Thus, according to an NDI signaling arrangement such as NDI signaling arrangement 700, TB-level NDIs for a set of TBs or HARQ IDs may be provided in a first TTI, and CBG-level NDIs may be provided in the first TTI, or in a second TTI different from the first TTI. In various examples the device receiving the bit sequence 710 may understand where to locate, and how to decode a CBG-level NDI set through various implicit or explicit configurations or signaling. For example, because a grant 770 may indicate a subset of HARQ IDs that the grant 770 corresponds to (e.g., by explicitly identifying a HARQ ID list, or by identifying a starting HARQ ID and a subsequent number of HARQ IDs). A device may therefore apply the above processing for the number of TBs or HARQ IDs carried in that grant (e.g., processing CBG NDI set 745-b based at least in part on the association of the second grant 770-b with the eighth HARQ ID of the data transmission 210).

Accordingly, the NDI signaling arrangement 700 may be an example of a variable-resource arrangement, where certain resources are allocated in a fixed manner to TB-level NDIs (e.g., the TB-level NDI set 740), and certain resources are allocated in a variable manner to CBG-level NDIs (e.g., the combined feedback of bitmap 750 and CBG-level NDI sets 745-a and 745-b). Further, the NDI signaling arrangement 700 may be an example of dividing the contents of a bit sequence 710 into different subsequences associated with different TTIs. In various examples a bit sequence 710 may be divided across more than two TTIs, and the bitmap 780 may be provided in different arrangements (e.g., a bitmap having a separate indicator for each of the TBs of a data transmission 210).

The total resources available to a device providing an NDI transmission 230 according to the NDI signaling arrangement 700 may be may be semi-statically configured (e.g., specifically associated with the use of the NDI signaling arrangement 700, or configured as part of a connection establishment between a UE 115 and a base station 105, such as an RRC configuration), or may be dynamically configured (e.g., according to specific allocation signaled with a data transmission 210). Thus, a device providing an NDI transmission 230 may determine the bitmap 780 by selecting CBG-level retransmission and NDIs for certain HARQ IDs based on any of the considerations described herein (e.g., to reduce or minimize the retransmission overhead). In some examples the total resources available to the device providing an NDI transmission 230 according to the NDI signaling arrangement 700 may not be preconfigured, and the device providing the NDI transmission 230 may determine how much of a generally available resource to use for the bit sequence 710 (e.g., based at least in part on a determined MCS, or based on balancing an NDI transmission 230 with other transmissions within the available resource).

Because the example of NDI signaling arrangement 700 is associated with variable resource allocations and multiple TTIs, the NDI signaling arrangement 700 may be associated with nominally greater overhead (e.g., associated with the bitmap 750 of the bit sequence 710). However, the example of NDI signaling arrangement 700 may provide an improvement in resource utilization efficiency, because resources not required for transmitting the bit sequence 710 may be used for another purpose (e.g., communications other than NDI transmission 230). Further, the example of NDI signaling arrangement 700 may provide an improvement in communications flexibility, because CBG-level NDI sets may accompany data transmissions 210 in the TTI that carries the data for the associated TB or HARQ ID.

Although the TB-level NDIs are shown with particular values (e.g., 0 or 1 for each HARQ ID), in some examples the TB-level NDIs may be a result of determining whether an associated NDI field of the TB-level NDI set 740 for a particular HARQ ID has a value that toggled (e.g., if an associated TB-level NDI field transitioned from 0 to 1, or from 1 to 0, which may provide an indication of new TB-level data for the respective HARQ ID, or no transition, which may provide an indication that at least a portion of the respective HARQ ID is associated with a retransmission). Similarly, although the CBG-level NDIs are shown with particular values (e.g., 0 or 1), in some examples the CBG-level NDIs may be a result of determining whether an associated NDI field of a CBG-level NDI set 745 has a value that toggled (e.g., if an associated CBG-level NDI field transitioned from 0 to 1, or from 1 to 0, which may provide an indication of no CBG-level retransmission for the respective HARQ ID, or no transition, which may provide an indication that the respective CBG of the HARQ ID is associated with a CBG-level retransmission).

For either TB-level NDIs or CBG-level NDIs, an initial value (e.g., prior to an opportunity for toggling) of an NDI field of the bit sequence 710 may itself provide an indication of new data or retransmission. For example, an initial value of "0" may indicate a retransmission, or an initial value of "1" may indicate new data or no retransmission. In the case of CBG-level NDIs, NDI fields for an initial CBG-level NDI set 745 for a given HARQ ID, upon a first TB-level indication of retransmission 725 for the given HARQ ID, may also be set according to initial values (e.g., an initial value of "0" may indicate a retransmission, or an initial value of "1" may indicate no retransmission). In some examples, upon a TB-level indication of new data 720 for that HARQ ID, the NDI fields of the CBG-level NDI set 745 may be reset such that new "initial values" may be determined for a CBG-level NDI set 745 upon a subsequent TB-level indication of retransmission 725 for that HARQ ID. In some examples, upon a TB-level indication of new data 720 for that HARQ ID, the NDI fields of the CBG-level NDI set 745 may not be reset (e.g., may be stored), such that toggling behavior may be determined for a CBG-level NDI set 745 upon a subsequent TB-level indication of retransmission 725 for that HARQ ID. Thus, various examples of multiplexing CBG-level and TB-level NDIs may employ various examples of indications (e.g., by value, or by toggling behavior, or a combination thereof) to indicate new data, retransmission, or no retransmission.

Figure 8:
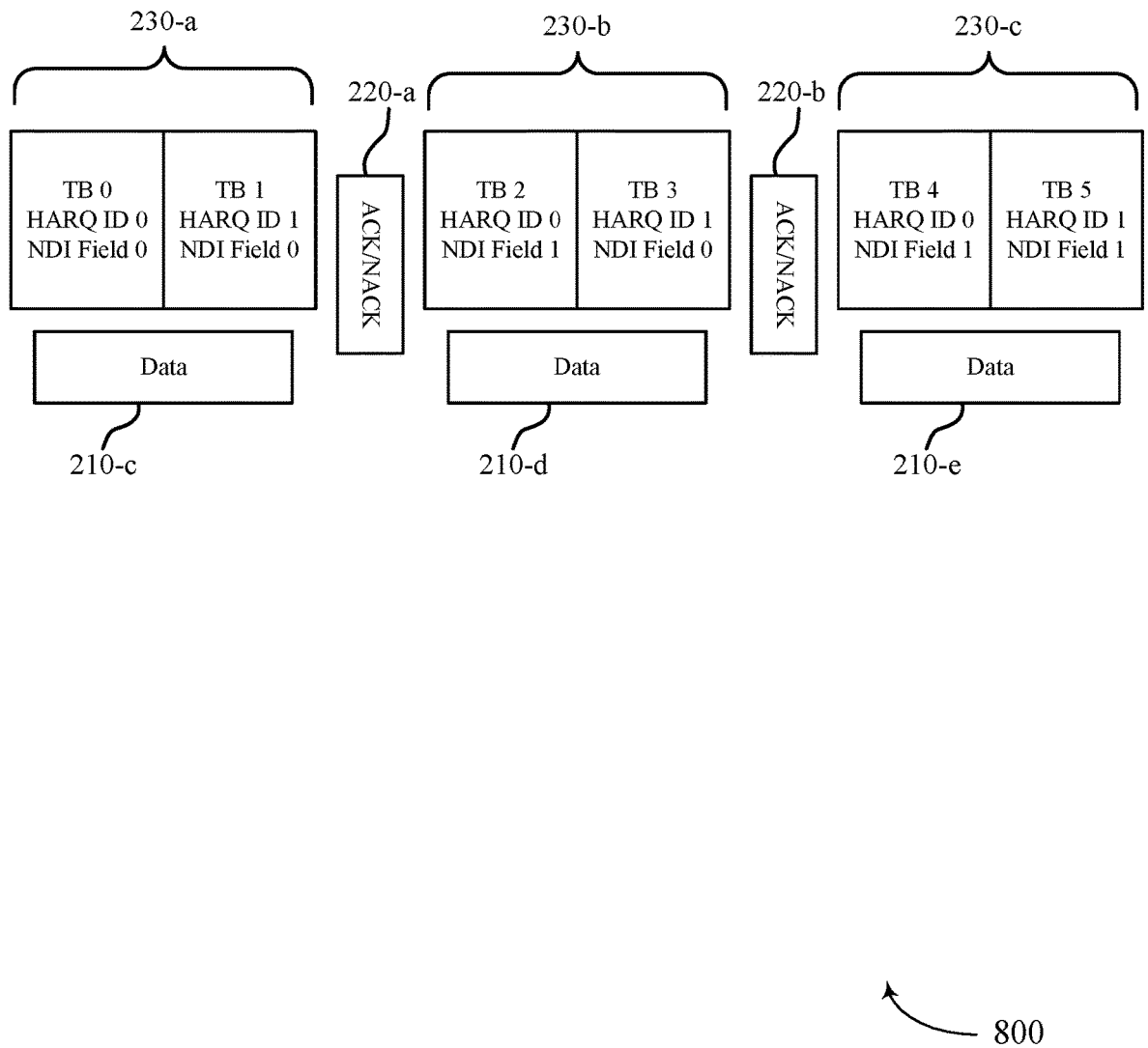
FIG. 8 illustrates an example of communication that supports multiplexing code block group level and transport block level transmission and NDIs in accordance with aspects of the present disclosure.

FIG. 8 illustrates an example of communication 800 that supports multiplexing CBG-level and TB-level transmission and NDIs in accordance with aspects of the present disclosure. In some examples, communication 800 may implement aspects of wireless communications systems 100, or wireless communication 200. Communication 800 may be associated with two HARQ processes (e.g., HARQ ID 0 and HARQ ID 1), and may include data transmissions 210, NDI transmissions 230 and feedback transmissions 220, which may be examples of the data transmissions 210, NDI transmissions 230, and feedback transmissions 220 described with reference to FIG. 2.

The NDI transmission 230-a may be associated with two TBs, TB 0 and TB 1, associated with HARQ ID 0 and HARQ ID 1, respectively. According to communication 800, TB 0 may be associated with a NDI field value of 0, and TB 1 may be associated with an NDI field value of 0, each of which may indicate that the TB-level transmissions associated with the respective HARQ IDs are new transmissions (e.g., as "initial values"). TB 0 and TB 1 may be transmitted in data transmission 210-c.

The NDI transmission 230-a and data transmission 210-c may be followed by a feedback transmission 220-a, which may provide feedback (e.g., ACK/NACK feedback) in response to the data transmission 210-c associated with the NDI transmission 230-a. In the example of communication 800, feedback transmission 220-a may indicate that the TB associated with HARQ ID 0 (e.g., TB 0) was successfully received, and that the TB associated with HARQ ID 1 (e.g., TB 1) was not successfully received.

The feedback transmission 220-a may be followed by an NDI transmission 230-b. The NDI transmission 230-b may be associated with two TBs, TB 2 and TB 3, associated with HARQ ID 0 and HARQ ID 1, respectively. In the NDI transmission 230-b, TB 2 may be associated with a NDI field value of 1, which may represent a toggled NDI field value for the HARQ ID 0 (e.g., different from the NDI field value of the NDI transmission 230-a for HARQ ID 0). In the example of communication 800, the toggled NDI field value for HARQ ID 0 may indicate that TB 2 is a TB-level transmission of new data. Further in the NDI transmission 230-b, TB 3 may be associated with a NDI field value of 0, which may represent a non-toggled NDI field value for the HARQ ID 1 (e.g., same as the NDI field value of the NDI transmission 230-a for HARQ ID 1). In the example of communication 800, the non-toggled NDI field value for HARQ ID 1 may indicate that TB 3 is a TB-level retransmission of TB 1, or contains a CBG-level retransmission of some portion of TB 1 (e.g., as indicated by other CBG-level NDI signaling, not shown). TB 1 and TB 3 may be transmitted in data transmission 210-d.

The NDI transmission 230-b and data transmission 210-d may be followed by a feedback transmission 220-b, which may provide feedback (e.g., ACK/NACK feedback) in response to a data transmission 210-d associated with the NDI transmission 230-b. In the example of communication 800, feedback transmission 220-b may indicate that the TB associated with HARQ ID 0 (e.g., TB 2) was not successfully received, and that the TB associated with HARQ ID 1 (e.g., TB 3) was successfully received.

The feedback transmission 220-b may be followed by an NDI transmission 230-c. The NDI transmission 230-c may be associated with two TBs, TB 4 and TB 5, associated with HARQ ID 0 and HARQ ID 1, respectively. In the NDI transmission 230-c, TB 4 may be associated with a NDI field value of 1, which may represent a non-toggled NDI field value for the HARQ ID 0 (e.g., same as the NDI field value of the NDI transmission 230-b for HARQ ID 0). In the example of communication 800, the non-toggled NDI field value for HARQ ID 0 may indicate that TB4 is a TB-level retransmission of TB 2, or contains a CBG-level retransmission of some portion of TB 2 (e.g., as indicated by other CBG-level signaling, not shown). Further in the NDI transmission 230-*c*, TB 5 may be associated with a NDI field value of 1, which may represent a toggled NDI field value for the HARQ ID 1 (e.g., different from the NDI field value of the NDI transmission 230-*b* for HARQ ID 1). In the example of communication 800, the toggled NDI field value for HARQ ID 1 may indicate that TB 5 is a TB-level transmission of new data. TB 4 and TB 5 may be transmitted in data transmission 210-*e*.

Thus, as illustrated by communication 800, an NDI field of an NDI transmission 230 may be monitored for a particular value (e.g., an "initial value") or transitions (e.g., toggling) to identify when a HARQ ID is associated with a new data transmission or a retransmission. Although the NDI fields of communication 800 are described in the context of TB-level NDIs, the described concepts may similarly be applied to CBG-level NDIs. In other words, in some examples the value of an NDI field (e.g., a bit field of a bit sequence) may or may not directly indicate whether a HARQ ID is associated with new data transmission or a retransmission, and a device may generate or process an NDI field of an NDI transmission 230 according to values, changes in value, or combinations thereof.

In some examples, using a toggling behavior may improve robustness of NDI communication. For example, if communications are not processed accurately (e.g., if a subframe cannot be decoded properly, or if a PDCCH is corrupted), using an absolute indication of an NDI field (e.g., where "1" indicates new data and "0" indicates a retransmission) may result in a receiving device improperly interpreting whether a particular TB or CBG is associated with a retransmission. Therefore, a toggling behavior may be employed (e.g., as generated by a transmitting device, and processed by a receiving device) as an affirmative indication that communications have been processed accurately.

Figure 9:
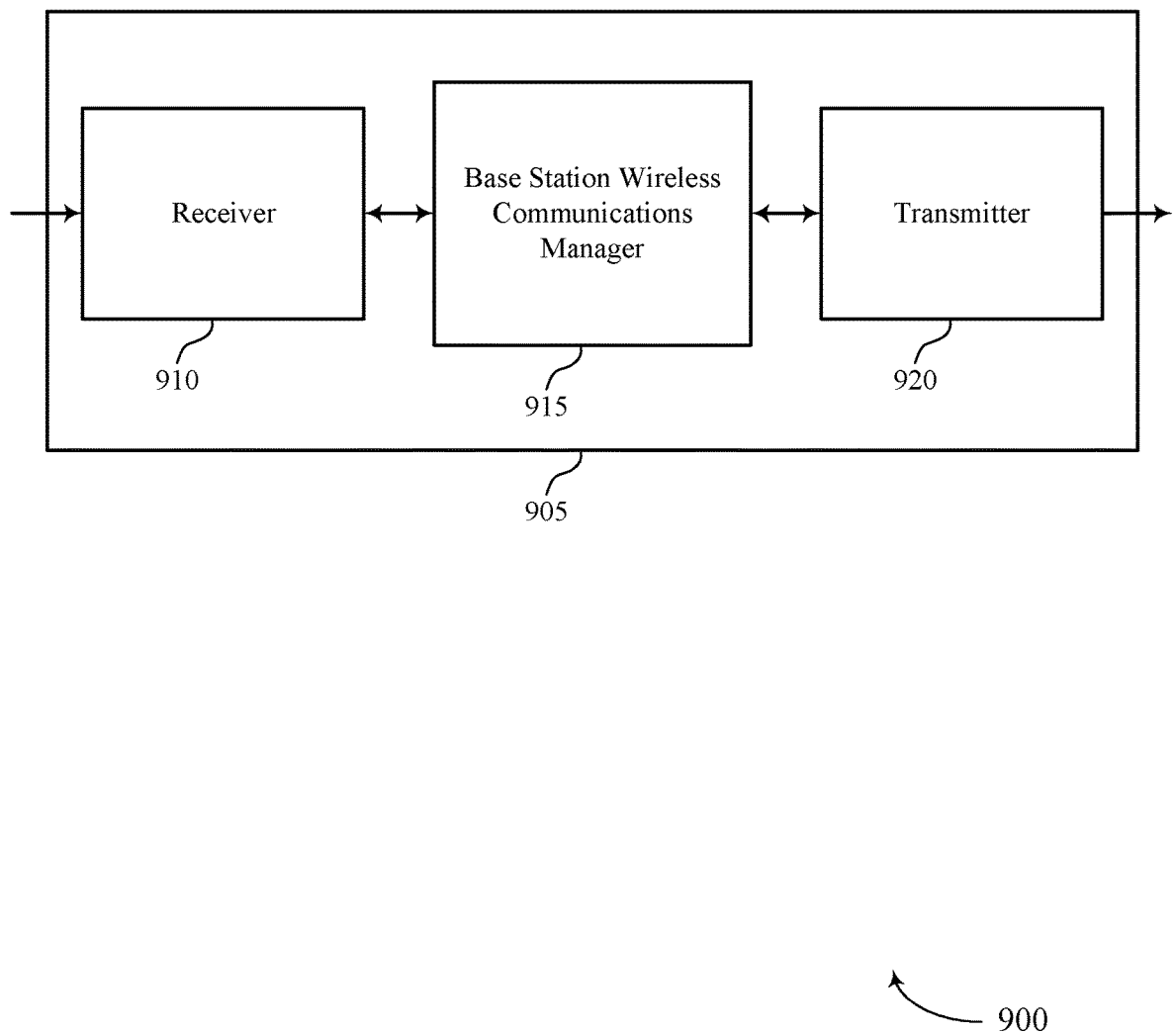
FIGS. 9 and 10 show block diagrams of devices that support multiplexing CBG-level and TB-level transmission and NDIs in accordance with aspects of the present disclosure.

FIG. 9 shows a block diagram 900 of a wireless device 905 that supports multiplexing CBG-level and TB-level transmission and NDIs in accordance with aspects of the present disclosure. Wireless device 905 may be an example of aspects of a base station 105 as described herein. Wireless device 905 may include receiver 910, base station wireless communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to multiplexing code block group level and transport block level transmission and new data indications, etc.). Information may be passed on to other components of the device. The receiver 910 may be an example of aspects of the transceiver 1235 described with reference to FIG. 12. The receiver 910 may utilize a single antenna or a set of antennas.

Base station wireless communications manager 915 and/or at least some of its various sub-components may be implemented in hardware, software executed by a processor, firmware, or any combination thereof. If implemented in software executed by a processor, the functions of the base station wireless communications manager 915 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station wireless communications manager 915 and/or at least some of its various sub-components may be physically located at various positions, including being distributed such that portions of functions are implemented at different physical locations by one or more physical devices. In some examples, base station wireless communications manager 915 and/or at least some of its various sub-components may be a separate and distinct component in accordance with various aspects of the present disclosure. In other examples, base station wireless communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure. Base station wireless communications manager 915 may be an example of aspects of the base station wireless communications manager 1215 described with reference to FIG. 12.

Base station wireless communications manager 915 may generate, for a transmission associated with a set of TBs, a bit sequence including TB-level indication (e.g., a TB-level NDI) of whether each TB in a first subset of TBs in the set of TBs includes a retransmission, and CBG-level indication (e.g., a CBG-level NDI) of whether a second subset of TBs in the set of TBs includes a CBG-level retransmission, transmit at least one grant including the bit sequence, and transmit the transmission associated with the set of TBs in accordance with the bit sequence. Although described in the context of operations performed by a base station 105, the operations and functions associated with the base station wireless communications manager 915 may also be associated with a UE 115 (e.g., relating to transmitting multiplexed CBG-level and TB-level transmissions and NDIs associated with an uplink data transmission).

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
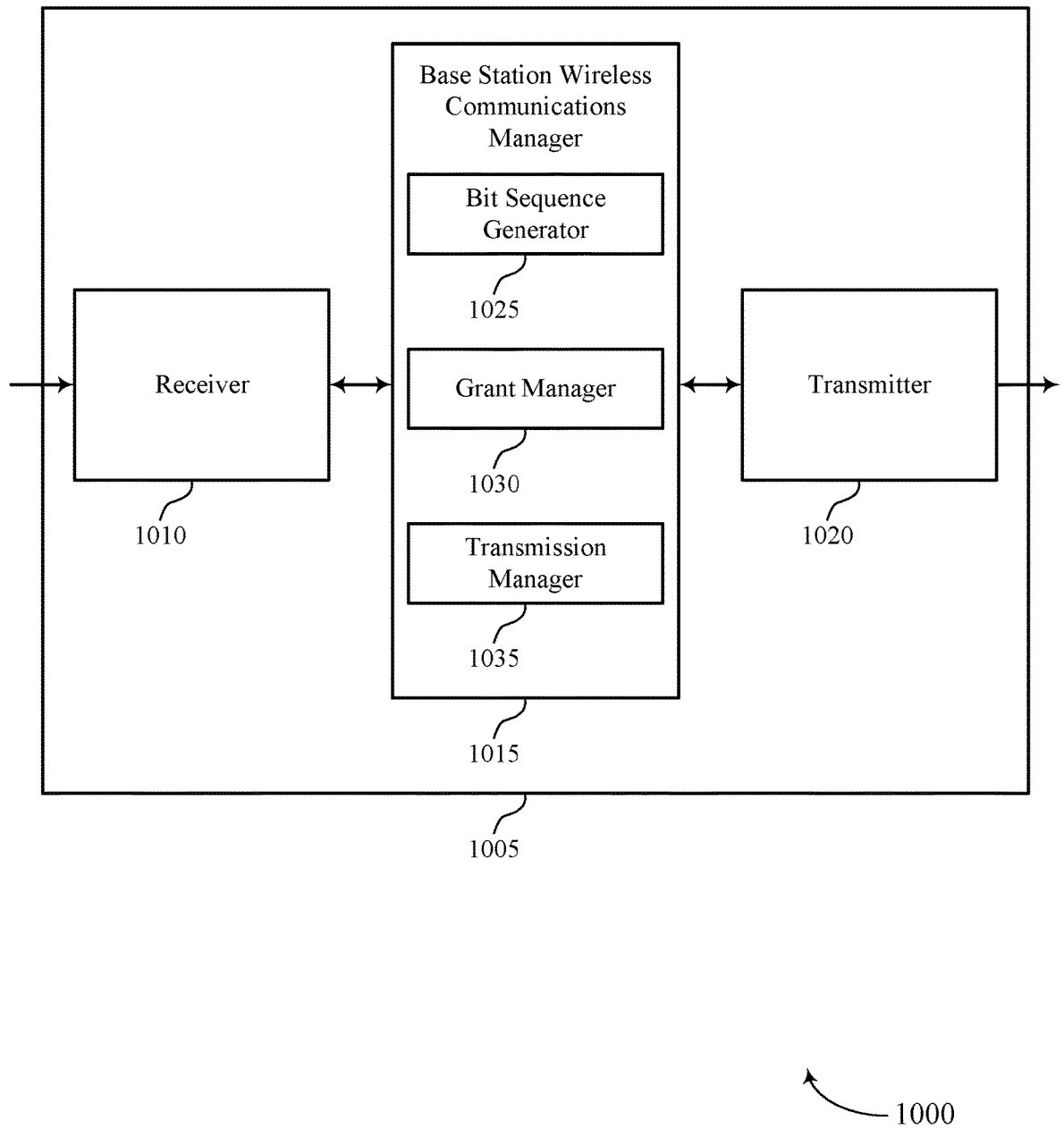

FIG. 10 shows a block diagram 1000 of a wireless device 1005 that supports multiplexing CBG-level and TB-level transmission and NDIs in accordance with aspects of the present disclosure. Wireless device 1005 may be an example of aspects of a wireless device 905 or a base station 105 as described with reference to FIG. 9. Wireless device 1005 may include receiver 1010, base station wireless communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to multiplexing code block group level and transport block level transmission and new data indications, etc.). Information may be passed on to other components of the device. The receiver 1010 may be an example of aspects of the transceiver 1235 described with reference to FIG. 12. The receiver 1010 may utilize a single antenna or a set of antennas.

Base station wireless communications manager 1015 may be an example of aspects of the base station wireless communications manager 1215 described with reference to FIG. 12. Base station wireless communications manager 1015 may also include bit sequence generator 1025, grant manager 1030, and transmission manager 1035. Although described in the context of operations performed by a base station 105, the operations and functions associated with the base station wireless communications manager 1015 may also be associated with a UE 115 (e.g., relating to transmitting multiplexed CBG-level and TB-level transmissions and NDIs associated with an uplink data transmission).

Bit sequence generator 1025 may generate, for a transmission associated with a set of TBs, a bit sequence including TB-level indication (e.g., a TB-level NDI) of whether each TB in a first subset of TBs in the set of TBs includes a retransmission, and CBG-level indication (e.g., a CBG-level NDI) of whether a second subset of TBs in the set of TBs includes a CBG-level retransmission.

Grant manager 1030 may transmit at least one grant including the bit sequence.

Transmission manager 1035 may transmit the transmission associated with the set of TBs in accordance with the bit sequence, allocate fixed resources to each TB of the set of TBs, and allocate resources to each TB of the set of TBs based on a ratio of a number of CBGs to be transmitted to a total number of CBGs in a respective TB in the set of TBs.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
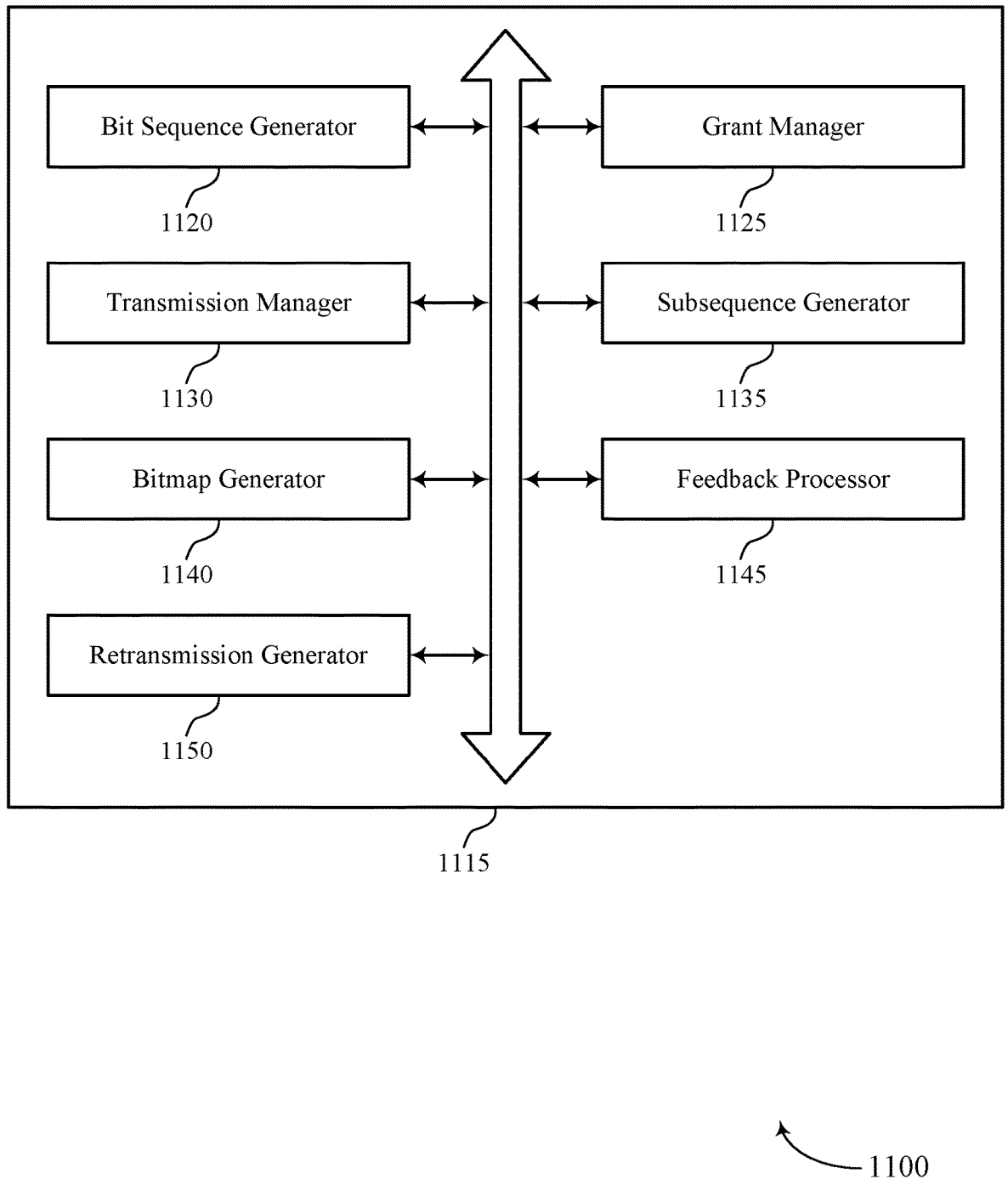
FIG. 11 shows a block diagram of a UE wireless communications manager that supports multiplexing CBG-level and TB-level transmission and NDIs in accordance with aspects of the present disclosure.

FIG. 11 shows a block diagram 1100 of a base station wireless communications manager 1115 that supports multiplexing CBG-level and TB-level transmission and NDIs in accordance with aspects of the present disclosure. The base station wireless communications manager 1115 may be an example of aspects of a base station wireless communications manager 915, a base station wireless communications manager 1015, or a base station wireless communications manager 1215 described with reference to FIGS. 9, 10, and 12. The base station wireless communications manager 1115 may include bit sequence generator 1120, grant manager 1125, transmission manager 1130, subsequence generator 1135, bitmap generator 1140, feedback processor 1145, and retransmission generator 1150. Each of these modules may communicate, directly or indirectly, with one another (e.g., via one or more buses). Although described in the context of operations performed by a base station 105, the operations and functions associated with the base station wireless communications manager 1115 may also be associated with a UE 115 (e.g., relating to transmitting multiplexed CBG-level and TB-level transmissions and NDIs associated with an uplink data transmission).

Bit sequence generator 1120 may generate, for a transmission associated with a set of TBs, a bit sequence including TB-level indication (e.g., a TB-level NDI) of whether each TB in a first subset of TBs in the set of TBs includes a retransmission, and CBG-level indication (e.g., a CBG-level NDI) of whether a second subset of TBs in the set of TBs includes a CBG-level retransmission.

Grant manager 1125 may transmit at least one grant including the bit sequence.

Transmission manager 1130 may transmit the transmission associated with the set of TBs in accordance with the bit sequence, allocate fixed resources to each TB of the set of TBs, and allocate resources to each TB of the set of TBs based on a ratio of a number of CBGs to be transmitted to a total number of CBGs in a respective TB in the set of TBs.

In some examples, subsequence generator 1135 may generate a first subsequence of the bit sequence indicating whether each TB in the set of TBs includes a retransmission, and a second subsequence indicating, for a respective TB that is indicated by the first subsequence to include a retransmission, whether a respective CBG in a set of CBGs for the respective TB includes a CBG-level retransmission. In some cases, the set of TBs are in an order, and the second subsequence may identify a defined number of TBs in the set of TBs at a beginning of the order as including a CBG-level retransmission, or a defined number of TBs in the set of TBs at an ending of the order as including a CBG-level retransmission, or a defined number of TBs in the set of TBs, after skipping a second defined number of TBs in the order that were not successfully received, as including a CBG-level retransmission. In some examples, subsequence generator 1135 may generate a third subsequence of one or more bits in the bit sequence indicating an order of the one or more TBs in the set of TBs that include a CBG-level retransmission from among the TBs indicated by the first subsequence as including a retransmission. In some examples, subsequence generator 1135 may generate a third subsequence of one or more bits in the bit sequence indicating that a defined number of TBs in the set of TBs do not include a CBG-level retransmission. In some examples, subsequence generator 1135 may generate a first subsequence of the bit sequence indicating whether a respective TB in the set of TBs includes a retransmission, and the bitmap may indicate which of the respective TBs in the set of TBs is a TB-level retransmission that includes a CBG HARQ retransmission grant.

In some examples, the bitmap generator 1140 may generate a bitmap in the bit sequence having a length corresponding to a number of TBs in the set of TBs that are a TB-level retransmission generated based on receiving CBG-level feedback. In some cases, the bitmap indicates a defined amount of resources for the CBG HARQ retransmission grant. In some cases, the defined amount of resources is based on a number of retransmissions in the set of TBs. In some examples, the bitmap generator 1140 may generate a first bitmap in the bit sequence to indicate the first and second subsets of TBs. In some examples, the bitmap generator 1140 may generate a set of bitmaps in the bit sequence to indicate TB-level NDIs or TB-level grants for the first subset of TBs and CBG-level NDIs or CBG-level HARQ retransmission grants for the second subset of TBs. In some cases, the TB-level grants indicate whether a respective TB in the first subset of TBs includes a TB-level retransmission. In some examples, the bitmap generator 1140 may generate a bitmap to indicate that each TB in the second subset of TBs is associated with a CBG-level retransmission grant and that each TB in a subset of the first subset of TBs is associated with a TB-level grant for a new TB transmission.

Feedback processor 1145 may receive an acknowledgement message associated with a set of feedback identifiers, where the grant corresponds to a subset of the feedback identifiers.

Retransmission generator 1150 may determine a sum of CBGs to be retransmitted for each TB in a set of TBs that includes a retransmission and identify the second subset of TBs based on the sums.

Figure 12:
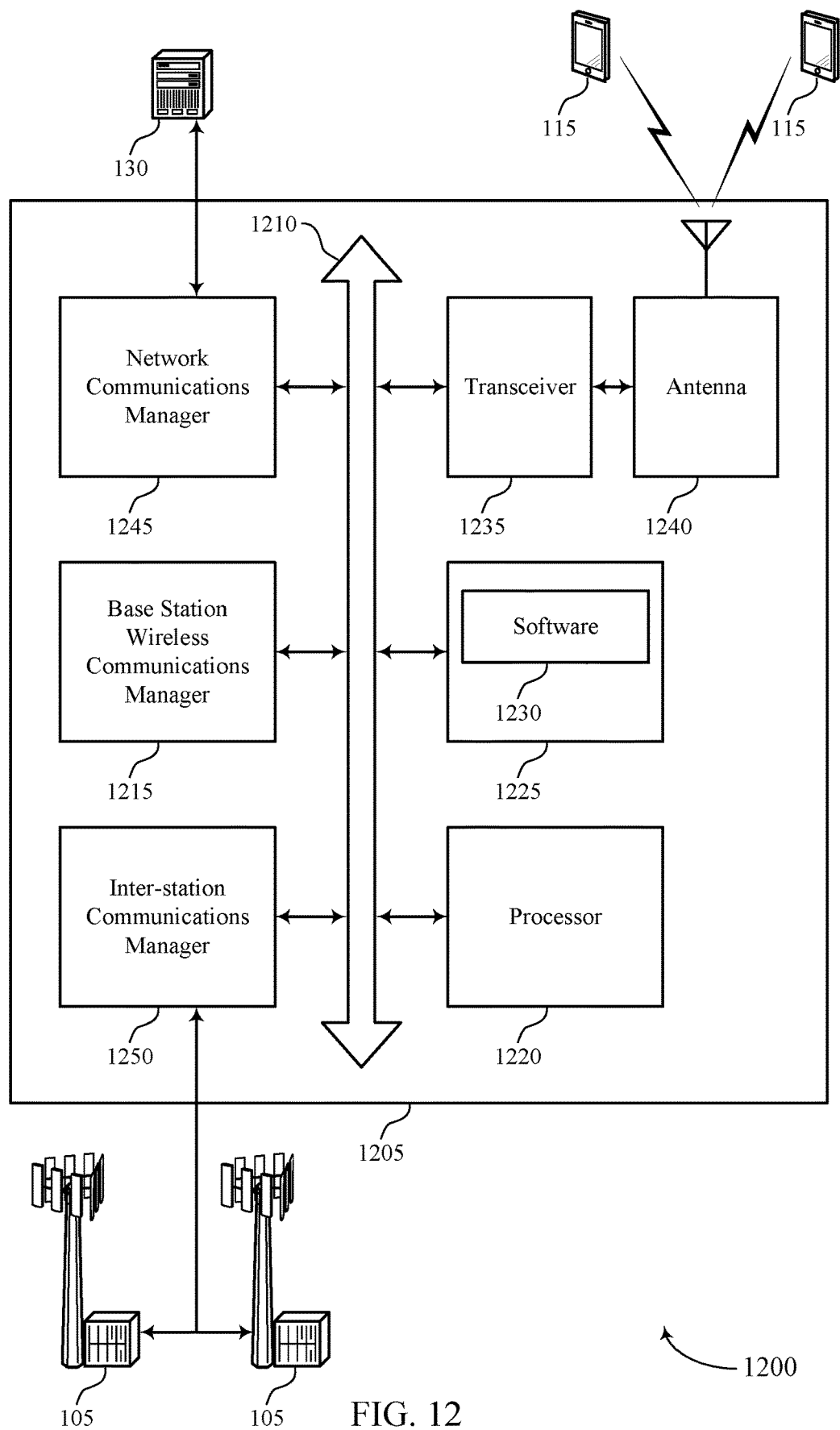
FIG. 12 illustrates a block diagram of a system including a base station that supports multiplexing CBG-level and TB-level transmission and NDIs in accordance with aspects of the present disclosure.

FIG. 12 shows a diagram of a system 1200 including a device 1205 that supports multiplexing CBG-level and TB-level transmission and NDIs in accordance with aspects of the present disclosure. Device 1205 may be an example of or include the components of wireless device 905, wireless device 1005, or a base station 105 as described above, e.g., with reference to FIGS. 9 and 10. Device 1205 may include components for bi-directional voice and data communications including components for transmitting and receiving communications, including base station wireless communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more user equipment (UE)s 115.

Processor 1220 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting multiplexing code block group level and transport block level transmission and new data indications).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware or software operation such as the interaction with peripheral components or devices.

Software 1230 may include code to implement aspects of the present disclosure, including code to support multiplexing code block group level and transport block level transmission and new data indications. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an LTE or LTE-A wireless communication network technology to provide communication between base stations 105.

Base station wireless communications manager 1215 may be an example of a base station wireless communications manager 915, 1015, or 1115 described with reference to FIGS. 9 through 11.

Figure 13:
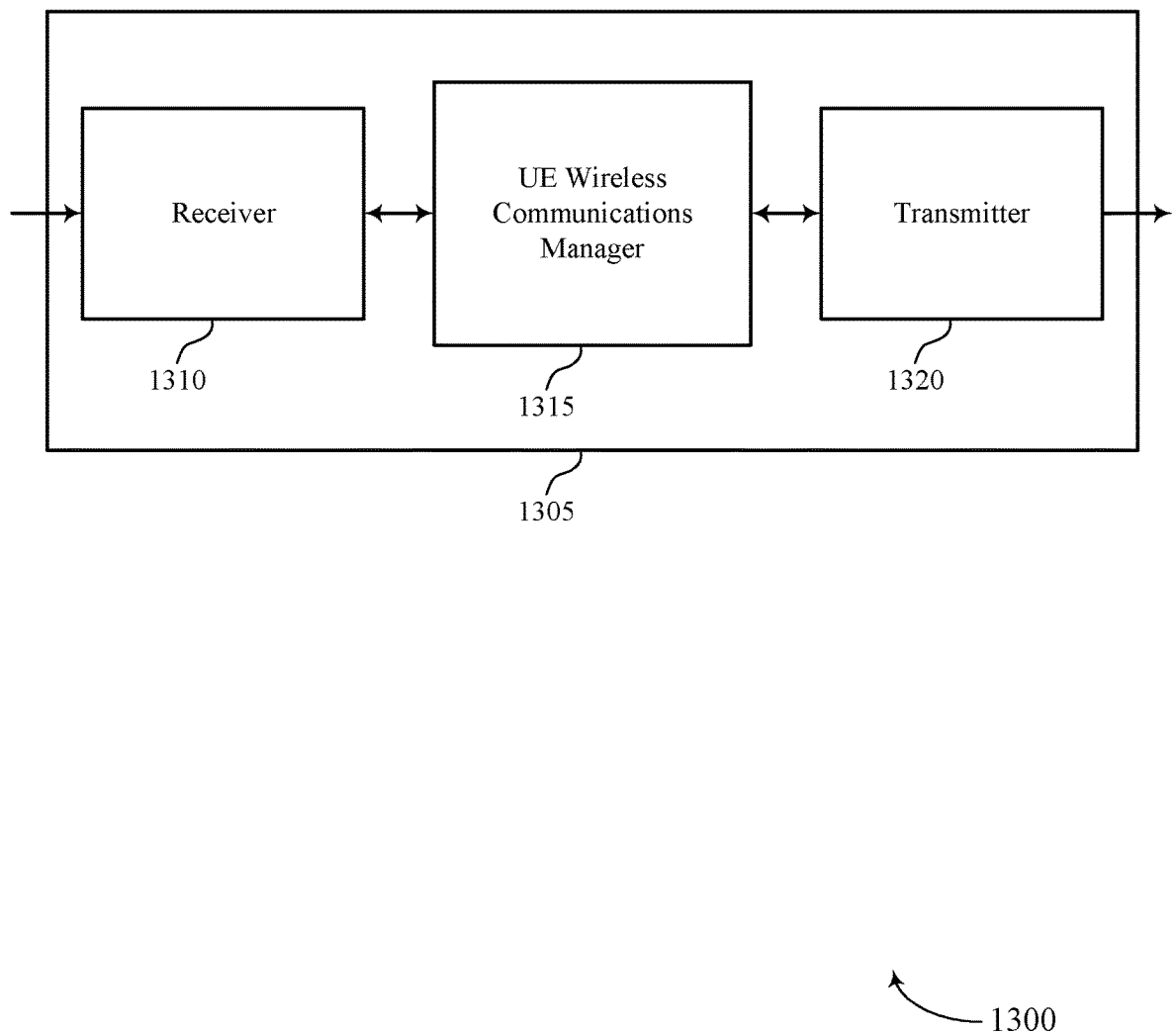
FIGS. 13 and 14 show block diagrams of devices that support multiplexing CBG-level and TB-level transmission and NDIs in accordance with aspects of the present disclosure.

FIG. 13 shows a block diagram 1300 of a wireless device 1305 that supports multiplexing CBG-level and TB-level transmission and NDIs in accordance with aspects of the present disclosure. Wireless device 1305 may be an example of aspects of a UE 115 as described herein. Wireless device 1305 may include receiver 1310, UE wireless communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to multiplexing code block group level and transport block level transmission and new data indications, etc.). Information may be passed on to other components of the device. The receiver 1310 may be an example of aspects of the transceiver 1635 described with reference to FIG. 16. The receiver 1310 may utilize a single antenna or a set of antennas.

UE wireless communications manager 1315 and/or at least some of its various sub-components may be implemented in hardware, software executed by a processor, firmware, or any combination thereof. If implemented in software executed by a processor, the functions of the UE wireless communications manager 1315 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE wireless communications manager 1315 and/or at least some of its various sub-components may be physically located at various positions, including being distributed such that portions of functions are implemented at different physical locations by one or more physical devices. In some examples, UE wireless communications manager 1315 and/or at least some of its various sub-components may be a separate and distinct component in accordance with various aspects of the present disclosure. In other examples, UE wireless communications manager 1315 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure. UE wireless communications manager 1315 may be an example of aspects of the UE wireless communications manager 1615 described with reference to FIG. 16.

UE wireless communications manager 1315 may receive a grant including a bit sequence including a TB-level indication (e.g., a TB-level NDI) of whether each TB in a first subset of TBs in the set of TBs includes a retransmission, and CBG-level indication (e.g., a CBG-level NDI) of whether a second subset of TBs in the set of TBs includes a CBG-level retransmission and monitor for the set of TBs based on the bit sequence. Although described in the context of operations performed by a UE 115, the operations and functions associated with the UE wireless communications manager 1315 may also be associated with a base station 105 (e.g., relating to processing multiplexed CBG-level and TB-level transmissions and NDIs associated with an uplink data transmission).

Transmitter 1320 may transmit signals generated by other components of the device. In some examples, the transmitter 1320 may be collocated with a receiver 1310 in a transceiver module. For example, the transmitter 1320 may be an example of aspects of the transceiver 1635 described with reference to FIG. 16. The transmitter 1320 may utilize a single antenna or a set of antennas.

Figure 14:
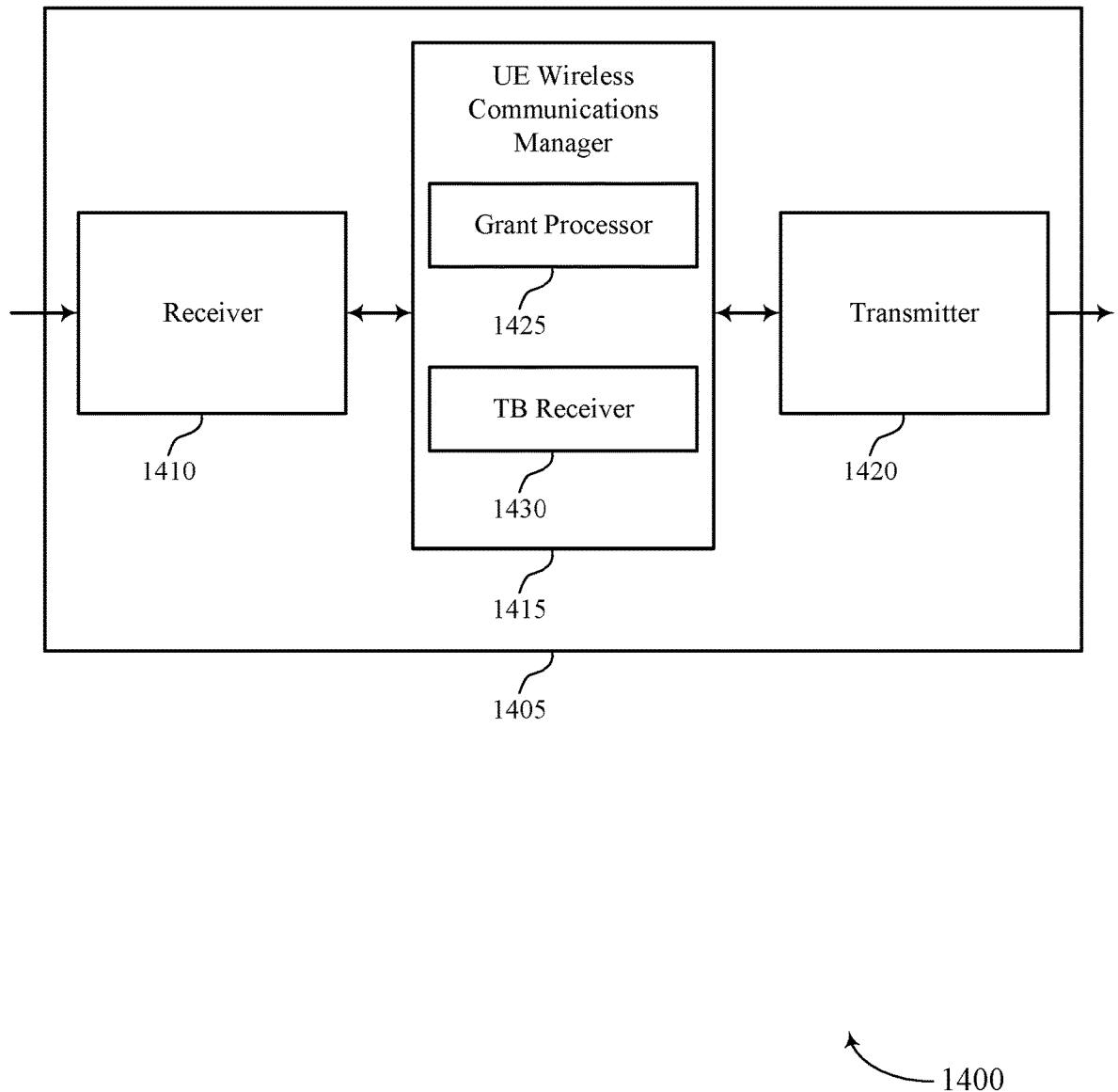

FIG. 14 shows a block diagram 1400 of a wireless device 1405 that supports multiplexing CBG-level and TB-level transmission and NDIs in accordance with aspects of the present disclosure. Wireless device 1405 may be an example of aspects of a wireless device 1305 or a UE 115 as described with reference to FIG. 13. Wireless device 1405 may include receiver 1410, UE wireless communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to multiplexing code block group level and transport block level transmission and new data indications, etc.). Information may be passed on to other components of the device. The receiver 1410 may be an example of aspects of the transceiver 1635 described with reference to FIG. 16. The receiver 1410 may utilize a single antenna or a set of antennas.

UE wireless communications manager 1415 may be an example of aspects of the UE wireless communications manager 1615 described with reference to FIG. 16. UE wireless communications manager 1415 may also include grant processor 1425 and TB receiver 1430. Although described in the context of operations performed by a UE 115, the operations and functions associated with the UE wireless communications manager 1415 may also be associated with a base station 105 (e.g., relating to processing multiplexed CBG-level and TB-level transmissions and NDIs associated with an uplink data transmission).

Grant processor 1425 may receive a grant including a bit sequence including a TB-level indication (e.g., a TB-level NDI) of whether each TB in a first subset of TBs in the set of TBs includes a retransmission, and CBG-level indication (e.g., a CBG-level NDI) of whether a second subset of TBs in the set of TBs includes a CBG-level retransmission. In some examples the grant processor 1425 may determine that the grant allocates fixed resources to each TB of the set of TBs. In some examples the grant processor 1425 may determine that the grant allocates resources to each TB of the set of TBs based on a ratio of a number of CBGs to be transmitted to a total number of CBGs in a respective TB of the set of TBs.

TB receiver 1430 may monitor for the set of TBs based on the bit sequence.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1635 described with reference to FIG. 16. The transmitter 1420 may utilize a single antenna or a set of antennas.

Figure 15:
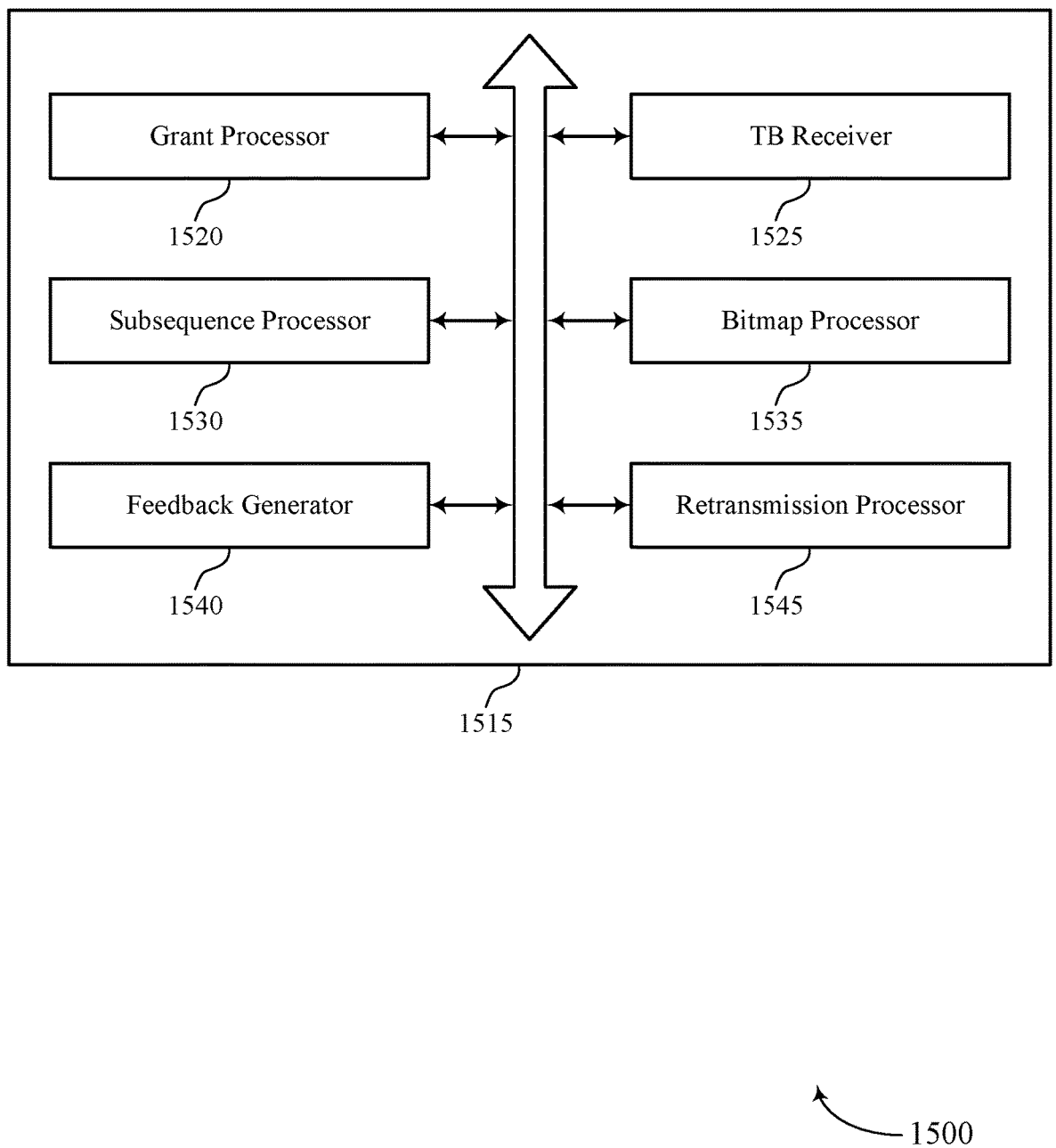
FIG. 15 shows a block diagrams of a base station wireless communications manager that supports multiplexing CBG-level and TB-level transmission and NDIs in accordance with aspects of the present disclosure.

FIG. 15 shows a block diagram 1500 of a UE wireless communications manager 1515 that supports multiplexing CBG-level and TB-level transmission and NDIs in accordance with aspects of the present disclosure. The UE wireless communications manager 1515 may be an example of aspects of a UE wireless communications manager 1615 described with reference to FIGS. 13, 14, and 16. The UE wireless communications manager 1515 may include grant processor 1520, TB receiver 1525, subsequence processor 1530, bitmap processor 1535, feedback generator 1540, and retransmission processor 1545. Each of these modules may communicate, directly or indirectly, with one another (e.g., via one or more buses). Although described in the context of operations performed by a UE 115, the operations and functions associated with the UE wireless communications manager 1515 may also be associated with a base station 105 (e.g., relating to processing multiplexed CBG-level and TB-level transmissions and NDIs associated with an uplink data transmission).

Grant processor 1520 may receive a grant including a bit sequence including a TB-level indication (e.g., a TB-level NDI) of whether each TB in a first subset of TBs in the set of TBs includes a retransmission, and CBG-level indication (e.g., a CBG-level NDI) of whether a second subset of TBs in the set of TBs includes a CBG-level retransmission. In some examples the grant processor 1520 may determine that the grant allocates fixed resources to each TB of the set of TBs. In some examples the grant processor 1520 may determine that the grant allocates resources to each TB of the set of TBs based on a ratio of a number of CBGs to be transmitted to a total number of CBGs in a respective TB of the set of TBs.

TB receiver 1525 may monitor for the set of TBs based on the bit sequence.

In some examples the subsequence processor 1530 may process a first subsequence of the bit sequence for determining whether each TB in the set of TBs includes a retransmission, and a second subsequence indicating, for a respective TB that is indicated by the first subsequence to include a retransmission, whether a respective CBG in a set of CBGs for the respective TB includes a CBG-level retransmission. In some examples the subsequence processor 1530 may process a third subsequence of one or more bits in the bit sequence indicating an order of the one or more TBs in the set of TBs that include a CBG-level retransmission from among the TBs indicated by the first subsequence as including a retransmission. In some examples the subsequence processor 1530 may process a third subsequence of one or more bits in the bit sequence for determining that a defined number of TBs in the set of TBs do not include a CBG-level retransmission. In some examples the subsequence processor 1530 may process a first subsequence of the bit sequence indicating whether a respective TB in the set of TBs includes a retransmission, where the bitmap indicates which of the respective TBs in the set of TBs is a TB-level retransmission that includes a CBG HARQ retransmission grant. In some cases, the set of TBs are in an order, and the second subsequence may identify a defined number of TBs in the set of TBs at a beginning of the order as including a CBG-level retransmission, or a defined number of TBs in the set of TBs at an ending of the order as including a CBG-level retransmission, or a defined number of TBs in the set of TBs, after skipping a second defined number of TBs in the order that were not successfully received, as including a CBG-level retransmission.

In some examples the bitmap processor 1535 may process a bitmap in the bit sequence having a length corresponding to a number of TBs in the set of TBs that are a TB-level retransmission generated based on receiving CBG-level feedback. In some examples the bitmap processor 1535 may process a first bitmap in the bit sequence for identifying the first and second subsets of TBs. In some examples the bitmap processor 1535 may process a set of bit maps in the bit sequence for identifying TB-level NDIs of TB-level grants for the first subset of TBs and CBG-level NDIs or CBG-level HARQ retransmission grants for the second subset of TBs. In some examples the bitmap processor 1535 may process a bitmap of the bit sequence to identify that each TB in the second subset of TBs has a CBG-level retransmission grant and that each TB in a subset of the first subset of TBs has a TB-level grant for a new TB transmission. In some cases, the bitmap indicates a defined amount of resources for the CBG-level retransmission grant. In some cases, the defined amount of resources is based on a number of retransmissions in the set of TBs. In some cases, the TB-level grants indicate whether a respective TB in the first subset of TBs includes a TB-level retransmission.

Feedback generator 1540 may transmit an acknowledgement message associated with a set of feedback identifiers, where the grant corresponds to a subset of the feedback identifiers.

Retransmission processor 1545 may determine a sum of CBGs to be retransmitted for each TB in a set of TBs that includes a retransmission and identify the second subset of TBs based on the sums.

Figure 16:
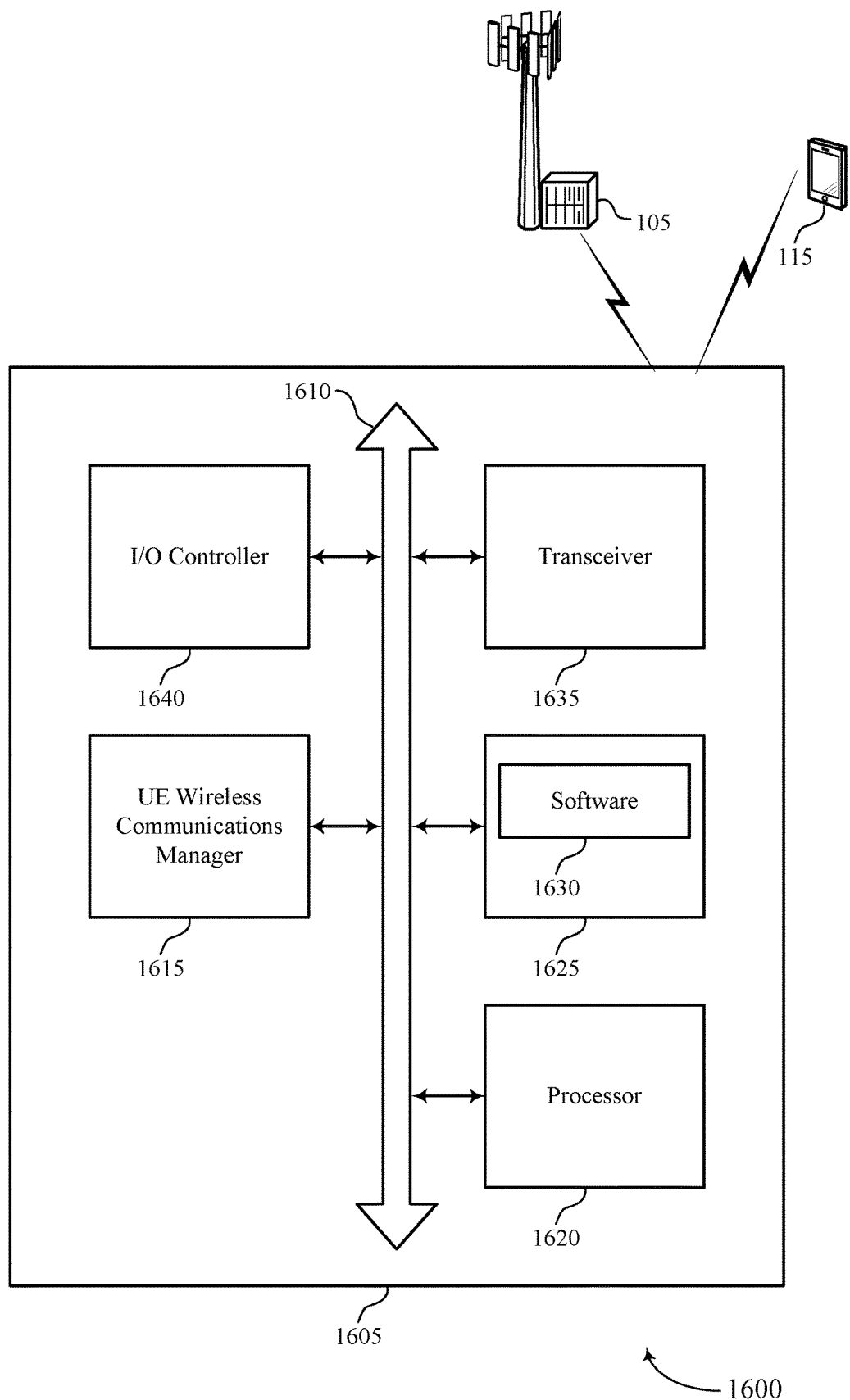
FIG. 16 illustrates a block diagram of a system including a UE that supports multiplexing CBG-level and TB-level transmission and NDIs in accordance with aspects of the present disclosure.

FIG. 16 shows a diagram of a system 1600 including a device 1605 that supports multiplexing CBG-level and TB-level transmission and NDIs in accordance with aspects of the present disclosure. Device 1605 may be an example of or include the components of UE 115 as described above, e.g., with reference to FIG. 1. Device 1605 may include components for bi-directional voice and data communications including components for transmitting and receiving communications, including UE wireless communications manager 1615, processor 1620, memory 1625, software 1630, transceiver 1635, and I/O controller 1640. These components may be in electronic communication via one or more buses (e.g., bus 1610).

Processor 1620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting multiplexing code block group level and transport block level transmission and new data indications).

Memory 1625 may include RAM and ROM. The memory 1625 may store computer-readable, computer-executable software 1630 including instructions that, when executed, cause the processor to perform various functions described herein. In some cases, the memory 1625 may contain, among other things, a BIOS which may control basic hardware or software operation such as the interaction with peripheral components or devices.

Software 1630 may include code to implement aspects of the present disclosure, including code to support multiplexing code block group level and transport block level transmission and new data indications. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

I/O controller 1640 may manage input and output signals for device 1605. I/O controller 1640 may also manage peripherals not integrated into device 1605. In some cases, I/O controller 1640 may represent a physical connection or port to an external peripheral. In some cases, I/O controller 1640 may utilize an operating system such as iOS®, ANDROID®, MS-DOS®, MS-WINDOWS®, OS/2®, UNIX®, LINUX®, or another known operating system. In other cases, I/O controller 1640 may represent or interact with a modem, a keyboard, a mouse, a touchscreen, or a similar device. In some cases, I/O controller 1640 may be implemented as part of a processor. In some cases, a user may interact with device 1605 via I/O controller 1640 or via hardware components controlled by I/O controller 1640.

UE wireless communications manager 1615 may be an example of a UE wireless communications manager 1315, 1415, or 1515 described with reference to FIGS. 13 through 15.

Figure 17:
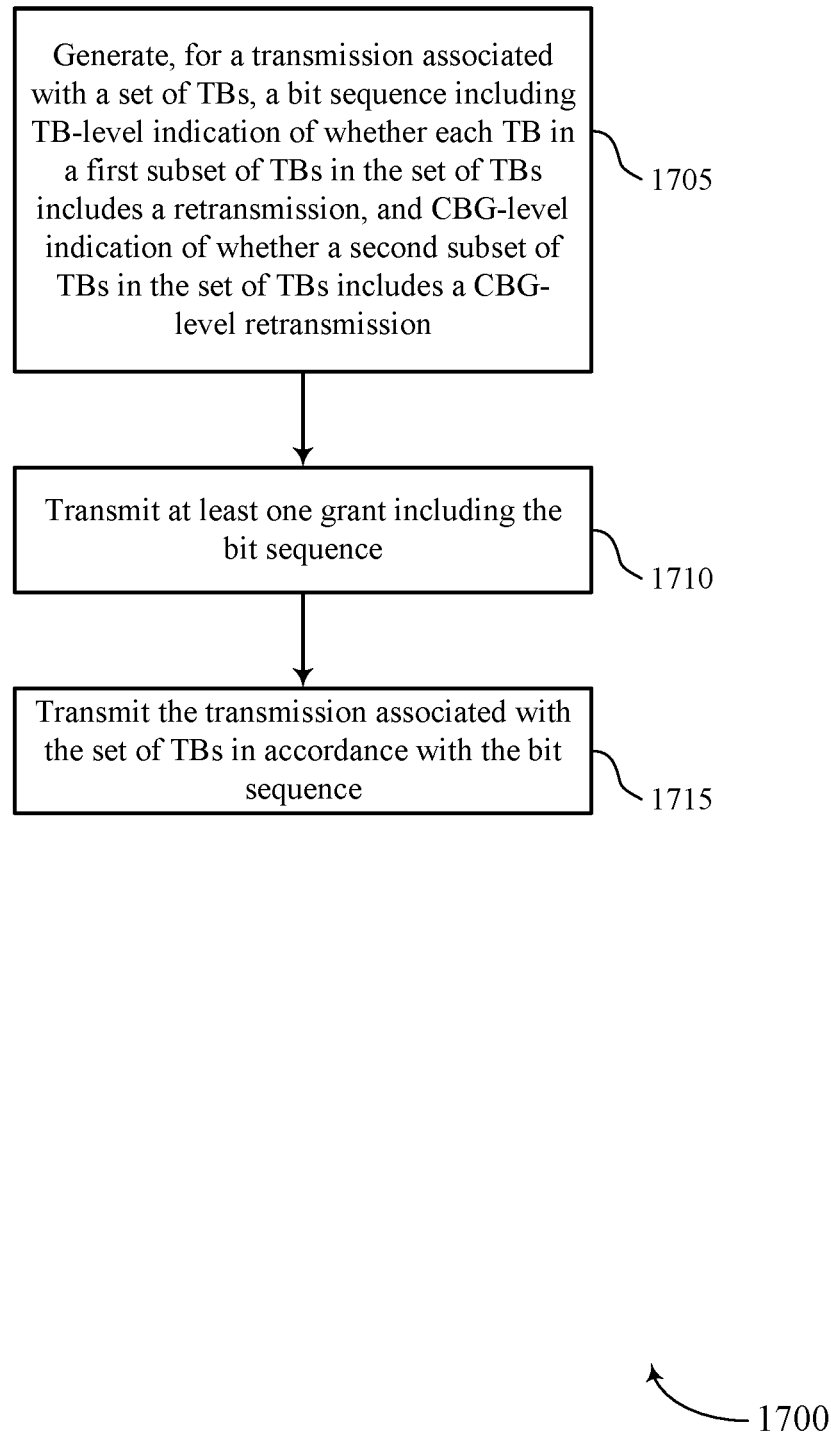
FIGS. 17 through 22 illustrate methods that support multiplexing CBG-level and TB-level transmission and NDIs in accordance with aspects of the present disclosure.

FIG. 17 shows a flowchart illustrating a method 1700 that supports multiplexing CBG-level and TB-level transmission and NDIs in accordance with aspects of the present disclosure. The operations of method 1700 may be implemented by a base station 105 or a UE 115, or their components as described herein, and is described below as being implemented by a base station 105. For example, the operations of method 1700 may be performed by a base station wireless communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1705 the base station 105 may generate, for a transmission associated with a set of TBs, a bit sequence including TB-level indication (e.g., a TB-level NDI) of whether each TB in a first subset of TBs in the set of TBs includes a retransmission, and CBG-level indication (e.g., a CBG-level NDI) of whether a second subset of TBs in the set of TBs includes a CBG-level retransmission. The operations of block 1705 may be performed according to the methods described herein. In certain examples, aspects of the operations of block 1705 may be performed by a bit sequence generator as described with reference to FIGS. 9 through 12.

At block 1710 the base station 105 may transmit at least one grant comprising the bit sequence. The operations of block 1710 may be performed according to the methods described herein. In certain examples, aspects of the operations of block 1710 may be performed by a grant manager as described with reference to FIGS. 9 through 12.

At block 1715 the base station 105 may transmit the transmission associated with the set of TBs in accordance with the bit sequence. The operations of block 1715 may be performed according to the methods described herein. In certain examples, aspects of the operations of block 1715 may be performed by a transmission manager as described with reference to FIGS. 9 through 12.

Figure 18:
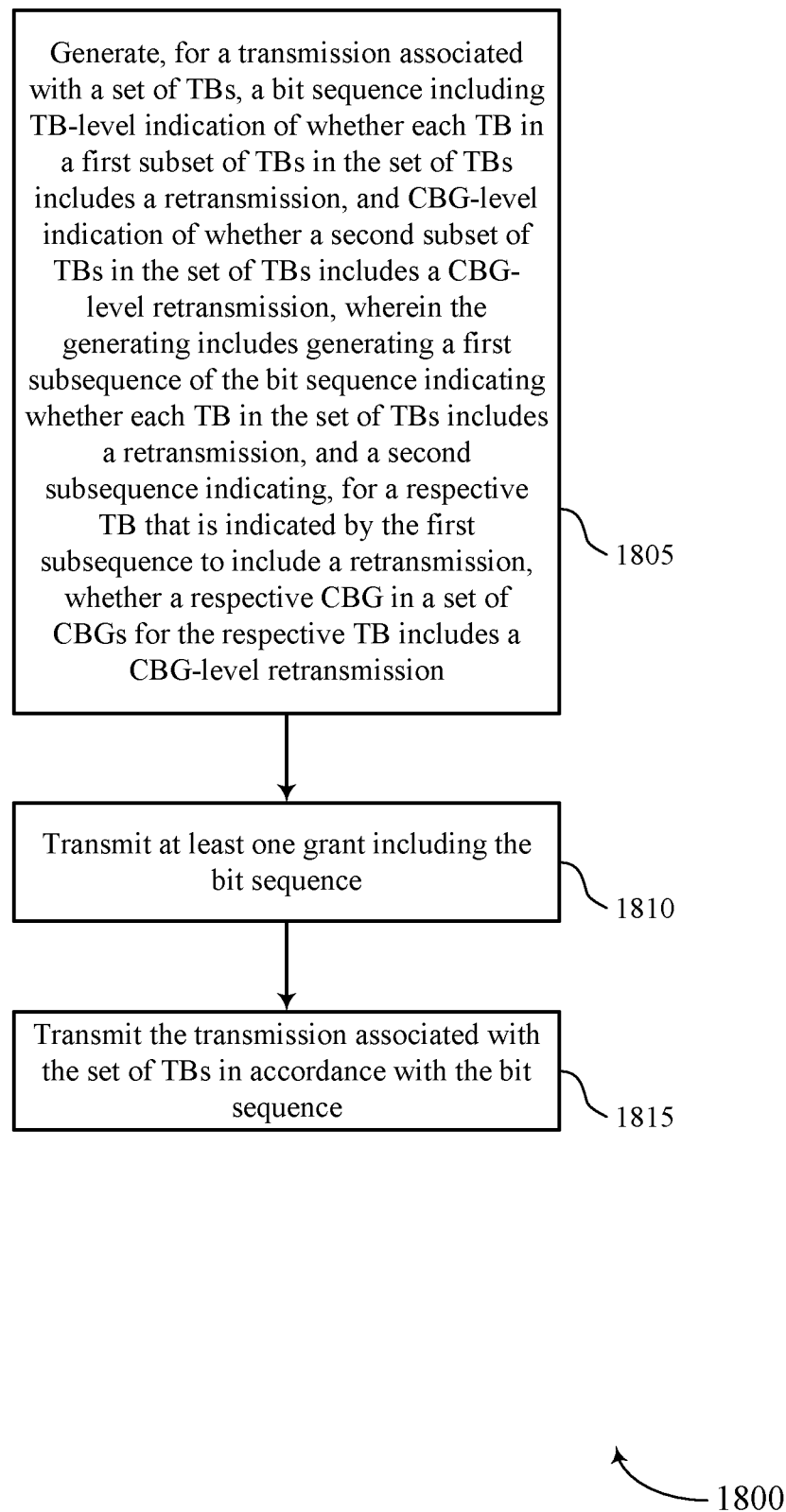

FIG. 18 shows a flowchart illustrating a method 1800 for multiplexing CBG-level and TB-level transmission and NDIs in accordance with aspects of the present disclosure. The operations of method 1800 may be implemented by a base station 105 or a UE 115, or their components as described herein, and is described below as being implemented by a base station 105. For example, the operations of method 1800 may be performed by a base station wireless communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may generate, for a transmission associated with a set of TBs, a bit sequence including TB-level indication (e.g., a TB-level NDI) of whether each TB in a first subset of TBs in the set of TBs includes a retransmission, and CBG-level indication (e.g., a CBG-level NDI) of whether a second subset of TBs in the set of TBs includes a CBG-level retransmission, wherein the generating includes generating a first subsequence of the bit sequence indicating whether each TB in the set of TBs includes a retransmission (e.g., to include a TB-level NDI for each TB in the set of TBs), and a second subsequence indicating, for a respective TB that is indicated by the first subsequence to include a retransmission, whether a respective CBG in a set of CBGs for the respective TB includes a CBG-level retransmission (e.g., including CBG-level NDIs for the respective TB that is indicated by the first subsequence to include a retransmission). The operations of block 1805 may be performed according to the methods described herein. In certain examples, aspects of the operations of block 1805 may be performed by a bit sequence generator as described with reference to FIGS. 9 through 12.

At block 1810 the base station 105 may transmit at least one grant comprising the bit sequence. The operations of block 1810 may be performed according to the methods described herein. In certain examples, aspects of the operations of block 1810 may be performed by a grant manager as described with reference to FIGS. 9 through 12.

At block 1815 the base station 105 may transmit the transmission associated with the set of TBs in accordance with the bit sequence. The operations of block 1815 may be performed according to the methods described herein. In certain examples, aspects of the operations of block 1815 may be performed by a transmission manager as described with reference to FIGS. 9 through 12.

Figure 19:
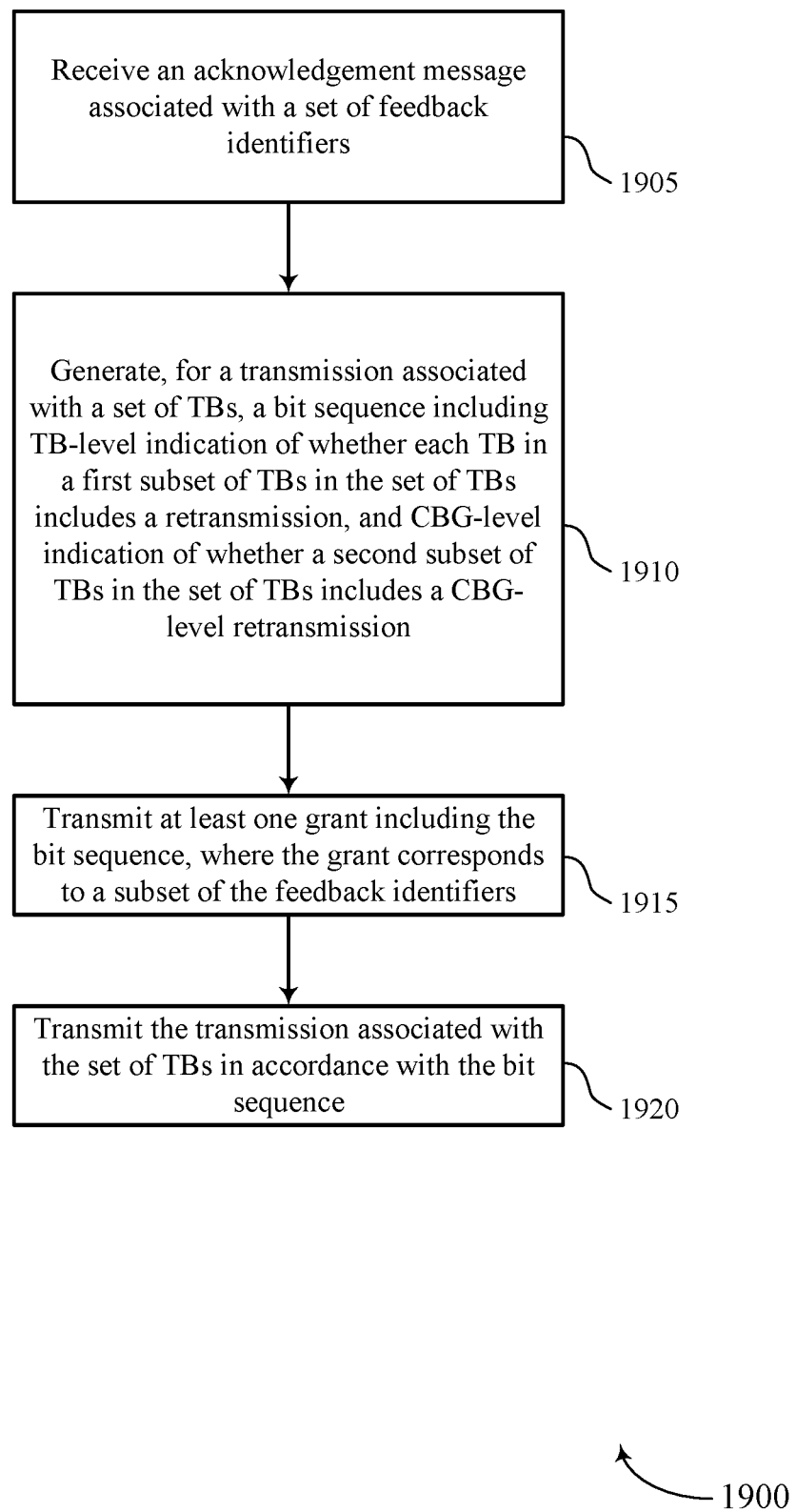

FIG. 19 shows a flowchart illustrating a method 1900 for multiplexing CBG-level and TB-level transmission and NDIs in accordance with aspects of the present disclosure. The operations of method 1900 may be implemented by a base station 105 or a UE 115, or their components as described herein, and is described below as being implemented by a base station 105. For example, the operations of method 1900 may be performed by a base station wireless communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1905 the base station 105 may receive an acknowledgement message associated with a set of feedback identifiers. The operations of block 1905 may be performed according to the methods described herein. In certain examples, aspects of the operations of block 1905 may be performed by a feedback processor as described with reference to FIGS. 9 through 12.

At block 1910 the base station 105 may generate, for a transmission associated with a set of TBs, a bit sequence including TB-level indication (e.g., a TB-level NDI) of whether each TB in a first subset of TBs in the set of TBs includes a retransmission, and CBG-level indication (e.g., a CBG-level NDI) of whether a second subset of TBs in the set of TBs includes a CBG-level retransmission. The operations of block 1910 may be performed according to the methods described herein. In certain examples, aspects of the operations of block 1910 may be performed by a bit sequence generator as described with reference to FIGS. 9 through 12.

At block 1915 the base station 105 may transmit at least one grant comprising the bit sequence, wherein the grant corresponds to a subset of the feedback identifiers. The operations of block 1915 may be performed according to the methods described herein. In certain examples, aspects of the operations of block 1915 may be performed by a grant manager as described with reference to FIGS. 9 through 12.

At block 1920 the base station 105 may transmit the transmission associated with the set of TBs in accordance with the bit sequence. The operations of block 1920 may be performed according to the methods described herein. In certain examples, aspects of the operations of block 1920 may be performed by a transmission manager as described with reference to FIGS. 9 through 12.

Figure 20:
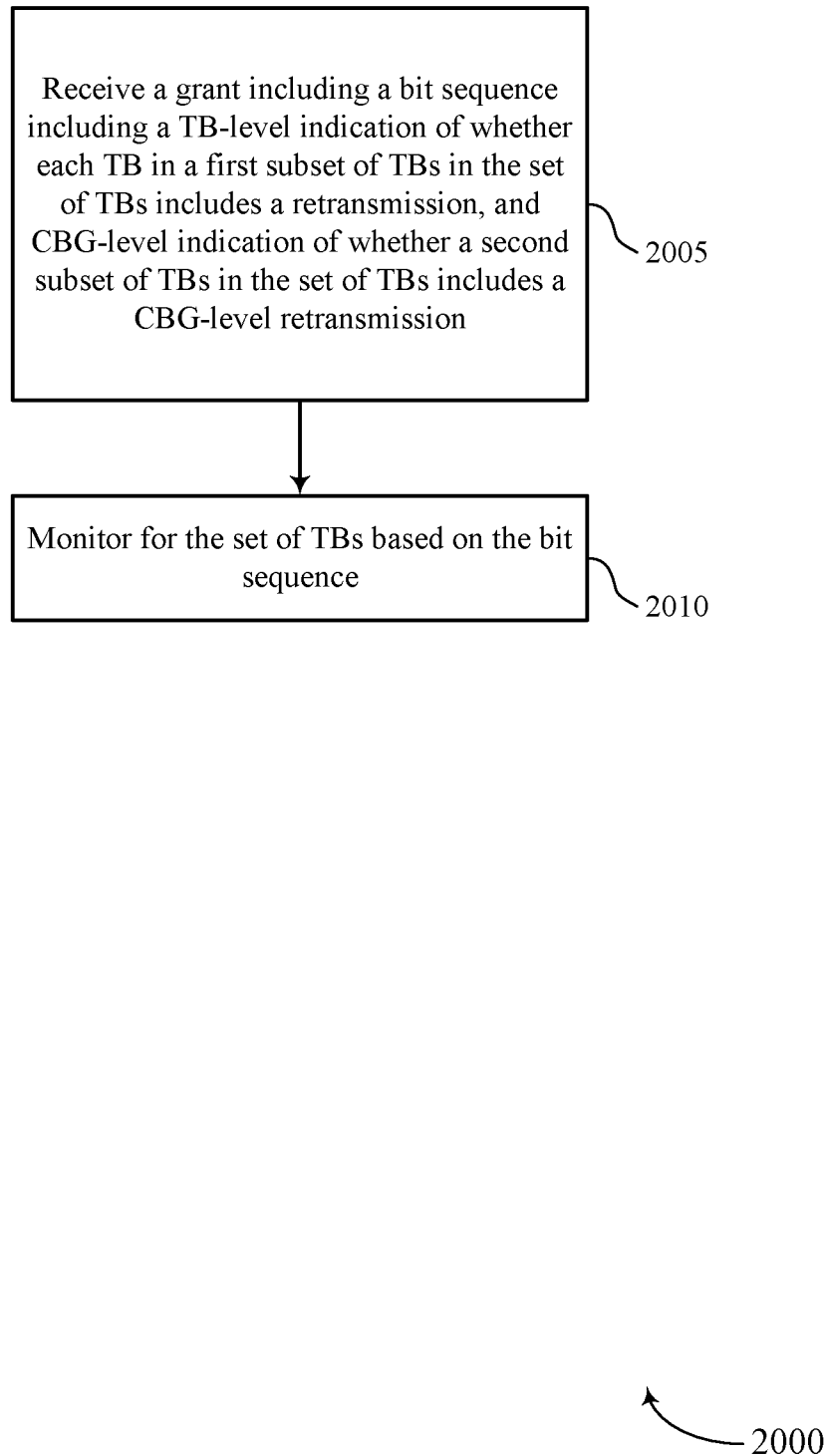

FIG. 20 shows a flowchart illustrating a method 2000 for multiplexing CBG-level and TB-level transmission and NDIs in accordance with aspects of the present disclosure. The operations of method 2000 may be implemented by a UE 115 or a base station 105, or their components as described herein, and is described below as being implemented by a UE 115. For example, the operations of method 2000 may be performed by a UE wireless communications manager as described with reference to FIGS. 13 through 16. In some examples, a UE 115 may execute a set of codes to control the functional elements of the device to perform the functions described below. Additionally or alternatively, the UE 115 may perform aspects of the functions described below using special-purpose hardware.

At block 2005 the UE 115 may receive a grant comprising a bit sequence including a TB-level indication (e.g., a TB-level NDI) of whether each TB in a first subset of TBs in the set of TBs includes a retransmission, and CBG-level indication (e.g., a CBG-level NDI) of whether a second subset of TBs in the set of TBs includes a CBG-level retransmission. The operations of block 2005 may be performed according to the methods described herein. In certain examples, aspects of the operations of block 2005 may be performed by a grant processor as described with reference to FIGS. 13 through 16.

At block 2010 the UE 115 may monitor for the set of TBs based at least in part on the bit sequence. The operations of block 2010 may be performed according to the methods described herein. In certain examples, aspects of the operations of block 2010 may be performed by a TB receiver as described with reference to FIGS. 13 through 16.

Figure 21:
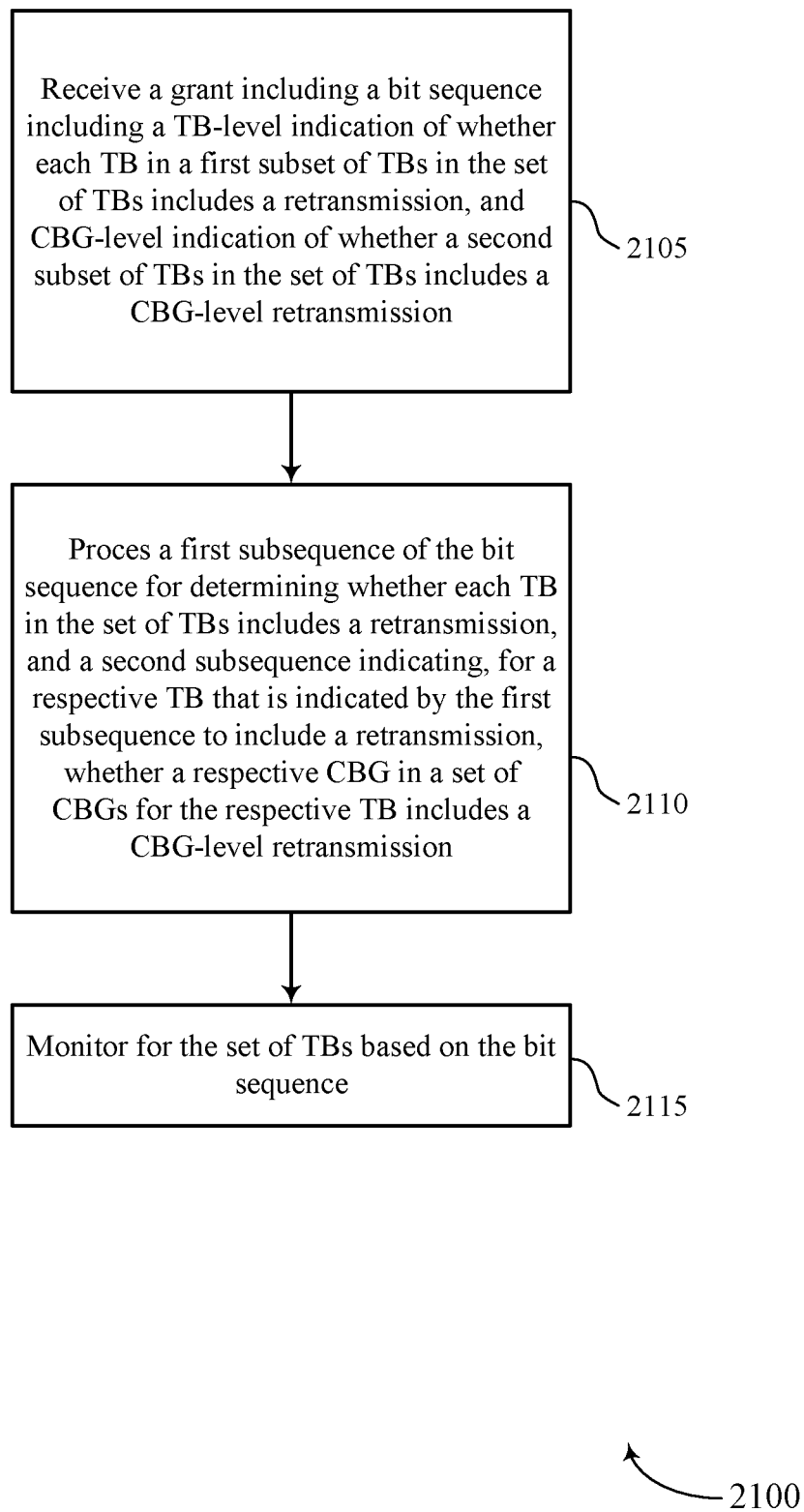

FIG. 21 shows a flowchart illustrating a method 2100 for multiplexing CBG-level and TB-level transmission and NDIs in accordance with aspects of the present disclosure. The operations of method 2100 may be implemented by a UE 115 or a base station 105, or their components as described herein, and is described below as being implemented by a UE 115. For example, the operations of method 2100 may be performed by a UE wireless communications manager as described with reference to FIGS. 13 through 16. In some examples, a UE 115 may execute a set of codes to control the functional elements of the device to perform the functions described below. Additionally or alternatively, the UE 115 may perform aspects of the functions described below using special-purpose hardware.

At block 2105 the UE 115 may receive a grant comprising a bit sequence including a TB-level indication (e.g., a TB-level NDI) of whether each TB in a first subset of TBs in the set of TBs includes a retransmission, and CBG-level indication (e.g., a CBG-level NDI) of whether a second subset of TBs in the set of TBs includes a CBG-level retransmission. The operations of block 2105 may be performed according to the methods described herein. In certain examples, aspects of the operations of block 2105 may be performed by a grant processor as described with reference to FIGS. 13 through 16.

At block 2110 the UE 115 may process a first subsequence of the bit sequence for determining whether each TB in the set of TBs includes a retransmission, and a second subsequence indicating, for a respective TB that is indicated by the first subsequence to include a retransmission, whether a respective CBG in a set of CBGs for the respective TB includes a CBG-level retransmission. The operations of block 2110 may be performed according to the methods described herein. In certain examples, aspects of the operations of block 2110 may be performed by a subsequence processor as described with reference to FIGS. 13 through 16.

At block 2115 the UE 115 may monitor for the set of TBs based at least in part on the bit sequence. The operations of block 2115 may be performed according to the methods described herein. In certain examples, aspects of the operations of block 2115 may be performed by a TB receiver as described with reference to FIGS. 13 through 16.

Figure 22:
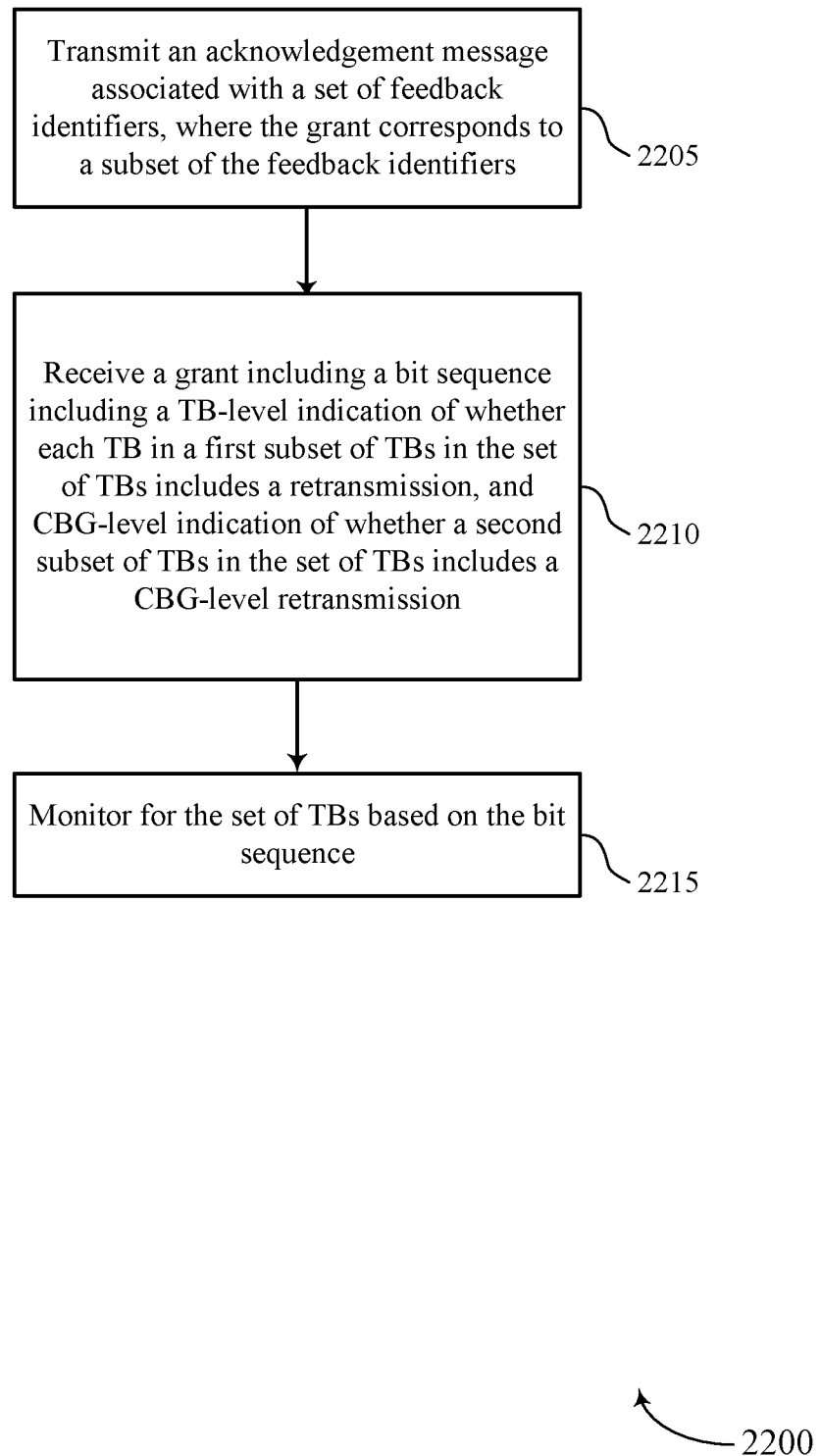

FIG. 22 shows a flowchart illustrating a method 2200 for multiplexing CBG-level and TB-level transmission and NDIs in accordance with aspects of the present disclosure. The operations of method 2200 may be implemented by a UE 115 or a base station 105, or their components as described herein, and is described below as being implemented by a UE 115. For example, the operations of method 2200 may be performed by a UE wireless communications manager as described with reference to FIGS. 13 through 16. In some examples, a UE 115 may execute a set of codes to control the functional elements of the device to perform the functions described below. Additionally or alternatively, the UE 115 may perform aspects of the functions described below using special-purpose hardware.

At block 2205 the UE 115 may transmit an acknowledgement message associated with a set of feedback identifiers, wherein the grant corresponds to a subset of the feedback identifiers. The operations of block 2205 may be performed according to the methods described herein. In certain examples, aspects of the operations of block 2205 may be performed by a feedback generator as described with reference to FIGS. 13 through 16.

At block 2210 the UE 115 may receive a grant comprising a bit sequence including a TB-level indication (e.g., a TB-level NDI) of whether each TB in a first subset of TBs in the set of TBs includes a retransmission, and CBG-level indication (e.g., a CBG-level NDI) of whether a second subset of TBs in the set of TBs includes a CBG-level retransmission. The operations of block 2210 may be performed according to the methods described herein. In certain examples, aspects of the operations of block 2210 may be performed by a grant processor as described with reference to FIGS. 13 through 16.

At block 2215 the UE 115 may monitor for the set of TBs based at least in part on the bit sequence. The operations of block 2215 may be performed according to the methods described herein. In certain examples, aspects of the operations of block 2215 may be performed by a TB receiver as described with reference to FIGS. 13 through 16.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
generating, for a transmission associated with a set of transport blocks (TBs), a bit sequence including TB-level new data indicators (NDIs) indicating whether each TB in a first subset of TBs in the set of TBs includes a retransmission, and code block group (CBG)-level NDIs indicating whether a second subset of TBs in the set of TBs includes a CBG-level retransmission;
transmitting at least one grant comprising the bit sequence; and
transmitting the transmission associated with the set of TBs in accordance with the at least one grant comprising the bit sequence.

2. The method of claim 1, wherein generating the bit sequence comprises:
generating a first subsequence of the bit sequence to include a TB-level NDI for each TB in the set of TBs, and a second subsequence to include, for a respective TB that is indicated by the first subsequence to include a retransmission, CBG-level NDIs for the respective TB.

3. The method of claim 2, wherein the set of TBs are in an order, and wherein the second subsequence identifies: a defined number of TBs in the set of TBs at a beginning of the order as including a CBG-level retransmission, or a defined number of TBs in the set of TBs at an ending of the order as including a CBG-level retransmission, or a defined number of TBs in the set of TBs, after skipping a second defined number of TBs in the order that were not successfully received, as including a CBG-level retransmission.

4. The method of claim 2, wherein generating the bit sequence comprises:
generating a third subsequence of one or more bits in the bit sequence indicating an order of the one or more TBs in the set of TBs that include a CBG-level retransmission from among the TBs indicated by the first subsequence as including a retransmission.

5. The method of claim 2, wherein transmitting at least one grant comprising the bit sequence comprises:
transmitting the first subsequence in a first grant; and
transmitting the second subsequence in a second grant.

6. The method of claim 1, wherein generating the bit sequence comprises:
generating a bitmap in the bit sequence having a length corresponding to a number of TBs in the set of TBs that are a TB-level retransmission generated based at least in part on receiving CBG-level feedback.

7. The method of claim 6, wherein generating the bit sequence comprises:
generating a first subsequence of the bit sequence indicating whether a respective TB in the set of TBs includes a retransmission, wherein the bitmap indicates which of the respective TBs in the set of TBs is a TB-level retransmission that includes a CBG-level retransmission.

8. The method of claim 7, wherein the bitmap indicates a defined amount of resources for the CBG-level retransmission.

9. The method of claim 8, wherein the defined amount of resources is based at least in part on a number of retransmissions in the set of TBs.

10. The method of claim 1, wherein generating the bit sequence comprises:
generating a first bitmap in the bit sequence to indicate the first and second subsets of TBs.

11. The method of claim 10, wherein generating the bit sequence comprises:
generating a set of bitmaps in the bit sequence to include TB-level NDIs for the first subset of TBs and CBG-level NDIs for the second subset of TBs.

12. The method of claim 1, wherein generating the bit sequence comprises:
generating a bitmap to indicate that each TB in the second subset of TBs is associated with a CBG-level NDI and that each TB in a subset of the first subset of TBs is associated with a TB-level NDI.

13. The method of claim 1, further comprising:
receiving an acknowledgement message associated with a set of feedback identifiers, wherein the at least one grant corresponds to a subset of the feedback identifiers.

14. The method of claim 1, further comprising:
determining a sum of CBGs to be retransmitted for each TB in a set of TBs that includes a retransmission; and
identifying the second subset of TBs based at least in part on the sums.

15. The method of claim 1, further comprising:
allocating fixed resources to each TB of the set of TBs.

16. The method of claim 1, further comprising:
allocating resources to each TB of the set of TBs based at least in part on a ratio of a number of CBGs to be transmitted to a total number of CBGs in a respective TB in the set of TBs.

17. A method for wireless communication, comprising:
receiving a grant comprising a bit sequence including a transport block (TB)-level new data indicators (NDIs) indicating whether each TB in a first subset of TBs in a set of TBs includes a retransmission, and code block group (CBG)-level NDIs indicating whether a second subset of TBs in the set of TBs includes a CBG-level retransmission; and
monitoring for the set of TBs based at least in part on the bit sequence.

18. The method of claim 17, further comprising:
processing a first subsequence of the bit sequence for determining whether each TB in the set of TBs includes a retransmission, and a second subsequence indicating, for a respective TB that is indicated by the first subsequence to include a retransmission, whether a respective CBG in a set of CBGs for the respective TB includes a CBG-level retransmission.

19. The method of claim 18, wherein the set of TBs are in an order, and wherein the second subsequence identifies: a defined number of TBs in the set of TBs at a beginning of the order as including a CBG-level retransmission, or a defined number of TBs in the set of TBs at an ending of the order as including a CBG-level retransmission, or a defined number of TBs in the set of TBs, after skipping a second defined number of TBs in the order that were not successfully received, as including a CBG-level retransmission.

20. The method of claim 18, further comprising:
processing a third subsequence of one or more bits in the bit sequence indicating an order of the one or more TBs in the set of TBs that include a CBG-level retransmission from among the TBs indicated by the first subsequence as including a retransmission.

21. The method of claim 18, further comprising:
receiving a second grant, wherein at least a portion of the second subsequence is received in the second grant.

22. The method of claim 17, further comprising:
processing a bitmap in the bit sequence having a length corresponding to a number of TBs in the set of TBs that are a TB-level retransmission generated based at least in part on receiving CBG-level feedback.

23. The method of claim 22, further comprising:
processing a first subsequence of the bit sequence indicating whether a respective TB in the set of TBs includes a retransmission, wherein the bitmap indicates which of the respective TBs in the set of TBs is a TB-level retransmission that includes a CBG hybrid automatic repeat request (HARQ) retransmission grant.

24. The method of claim 23, wherein the bitmap indicates a defined amount of resources for the CBG HARQ retransmission grant.

25. The method of claim 24, wherein the defined amount of resources is based at least in part on a number of retransmissions in the set of TBs.

26. The method of claim 17, further comprising:
processing a first bitmap in the bit sequence for identifying the first and second subsets of TBs.

27. The method of claim 26, further comprising:
processing a set of bit maps in the bit sequence for identifying TB-level NDIs for the first subset of TBs and CBG-level NDIs for the second subset of TBs.

28. The method of claim 17, further comprising:
processing a bitmap of the bit sequence to identify that each TB in the second subset of TBs has a CBG-level retransmission grant and that each TB in a subset of the first subset of TBs has a TB-level grant for a new TB transmission.

29. An apparatus for wireless communication, comprising:
a transmitter;
a processor;
memory in electronic communication with the processor; and
instructions stored in the memory and operable, when executed by the processor, to cause the apparatus to:
generate, for a transmission associated with a set of transport blocks (TBs), a bit sequence including TB-level indication of whether each TB in a first subset of TBs in the set of TBs includes a retransmission, and code block group (CBG)-level indication of whether a second subset of TBs in the set of TBs includes a CBG-level retransmission;
transmit, via the transmitter, at least one grant comprising the bit sequence; and
transmit, via the transmitter, the transmission associated with the set of TBs in accordance with the at least one grant comprising the bit sequence.

30. An apparatus for wireless communication, comprising:
a receiver;
a processor;
memory in electronic communication with the processor; and
instructions stored in the memory and operable, when executed by the processor, to cause the apparatus to:
receive, via the receiver, a grant comprising a bit sequence including a transport block (TB)-level indication of whether each TB in a first subset of TBs in a set of TBs includes a retransmission, and code block group (CBG)-level indication of whether a second subset of TBs in the set of TBs includes a CBG-level retransmission; and
monitor, via the receiver, for the set of TBs based at least in part on the bit sequence.

* * * * *